(12) United States Patent
Chen et al.

(10) Patent No.: US 11,816,560 B2
(45) Date of Patent: Nov. 14, 2023

(54) PERFORMANCE ESTIMATION-BASED RESOURCE ALLOCATION FOR RECONFIGURABLE ARCHITECTURES

(71) Applicant: SambaNova Systems, Inc., Palo Alto, CA (US)

(72) Inventors: Zhuo Chen, Mountain View, CA (US); Sumti Jairath, Santa Clara, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 17/883,407

(22) Filed: Aug. 8, 2022

(65) Prior Publication Data

US 2022/0374695 A1 Nov. 24, 2022

Related U.S. Application Data

(63) Continuation of application No. 16/572,527, filed on Sep. 16, 2019, now Pat. No. 11,410,027.

(51) Int. Cl.
*G06N 3/063* (2023.01)
*G06F 16/904* (2019.01)
*G06F 15/78* (2006.01)

(52) U.S. Cl.
CPC ......... *G06N 3/063* (2013.01); *G06F 15/7892* (2013.01); *G06F 16/904* (2019.01)

(58) Field of Classification Search
None
See application file for complete search history.

(56) References Cited

U.S. PATENT DOCUMENTS

| | | | |
|---|---|---|---|
| 11,001,196 B1* | 5/2021 | Alexander | B60Q 1/507 |
| 2010/0281429 A1* | 11/2010 | Kheiri | G06F 3/0481 |
| | | | 715/810 |
| 2014/0136777 A1* | 5/2014 | Davis | G06F 3/0689 |
| | | | 711/114 |

(Continued)

OTHER PUBLICATIONS

Ruschke, T. et al., Scheduler for Inhomogeneous and Irregular CGRAs with Support for Complex Control Flow, 2016, IEEE, pp. 198-207. (Year: 2016).*

*Primary Examiner* — Eric Coleman
(74) *Attorney, Agent, or Firm* — Flagship Patents; Sikander Khan; Bruce Young

(57) ABSTRACT

The technology disclosed relates to allocating available physical compute units (PCUs) and/or physical memory units (PMUs) of a reconfigurable data processor to operation units of an operation unit graph for execution thereof. In particular, it relates to selecting, for evaluation, an intermediate stage compute processing time between lower and upper search bounds of a generic stage compute processing time, determining a pipeline number of the PCUs and/or the PMUs required to process the operation unit graph, and iteratively, initializing new lower and upper search bounds of the generic stage compute processing time and selecting, for evaluation in a next iteration, a new intermediate stage compute processing time taking into account whether the pipeline number of the PCUs and/or the PMUs produced for a prior intermediate stage compute processing time in a previous iteration is lower or higher than the available PCUs and/or PMUs.

18 Claims, 20 Drawing Sheets

(56) References Cited

U.S. PATENT DOCUMENTS

| | | | |
|---|---|---|---|
| 2015/0154055 A1* | 6/2015 | Branson | G06F 9/5061 |
| | | | 718/104 |
| 2016/0299998 A1* | 10/2016 | Isshiki | G06F 30/327 |
| 2019/0004994 A1* | 1/2019 | Fleming | G06F 15/8023 |
| 2020/0159692 A1* | 5/2020 | Shah | G06F 15/7867 |

* cited by examiner

Pattern Graph 300

```
[
    {
        "nodes": {
            "1": "Conv2D",
            "2": "BatchNorm",                    — 302
            "3": "Relu"
        },
        "edges": {
            "2": ["1"],                          — 312
            "3": ["2"]
        },
        "fused_node": "Conv2DBNRelu"             — 322
    },
    {
        "nodes": {
            "1": "Conv2D",
            "2": "BatchNorm"
        },
        "edges": {
            "2": ["1"]
        },
        "fused_node": "Conv2DBN"                 — 332
    },
    {
        "nodes": {
            "1": "Conv2D",
            "2": "Relu"
        },
        "edges": {
            "2": ["1"]
        },
        "fused_node": "Conv2DRelu"               — 342
    },
    {
        "nodes": {
            "1": "Mm",
            "2": "Add"
        },
        "edges": {
            "2": ["1"]
        },
        "fused_node": "Addmm"                    — 352
    }
]
```

FIG. 3

Pattern Graph 400

Resource Determination 1400

```
def get_graph_PCUs (stage_latency) :
    total_PCUs = 0
    for node in fused_graph :
        node_latency_with_one_PCU =
            node.get_flop () / (PCU_flops * node.get_util ())
        node_PCUs = ceil (node_latency_with_one_PCU / stage_latency)
        total_PCUs = total_PCUs + node_PCUs
    return total_PCUs
```

FIG. 14

Addition Stage Compute Load 1500 total_flop = output.get_num_elements() ⌐1502
⌐1512 input_shape = input.get_shape() //this will be tensor shape, e.g. [512,10,32]
⌐1522 n_passes = input.get_num_elements() / input_shape[-1] / config.PCU_N_SIMD_LANES ⌐1534

PCU_utilization = n_passes / math.ceil(n_passes) / config.PCU_N_STAGES / 2 ⌐1536
⌐1532

FIG. 15

Matrix Multiplication Stage Compute Load 1600

// suppose we have two matrices, the first has shape [M, K], the second has [K, N] ⌐1602 total_flop = M * K * N * 2
⌐1612 n_passes = M / config.PCU_N_SIMD_LANES * N / config.PCU_N_STAGES

PCU_utilization = n_passes / math.ceil(n_passes)
⌐1622

FIG. 16

Stage Compute Processing Times 1800

| Operation Unit | Utilization (%) | Latency (us) |
|---|---|---|
| Conv1 (Convolution) 1702 | 95 | 200 |
| Add1 (Addition) 1712 | 18 | 18 |
| Conv2 (Convolution) 1722 | 92 | 110 |
| Add2 (Addition) 1732 | 16 | 9 |
| MM (Matrix Multiplication) 1742 | 88 | 50 |

FIG. 18

PERFORMANCE ESTIMATION-BASED RESOURCE ALLOCATION FOR RECONFIGURABLE ARCHITECTURES

CROSS-REFERENCE TO OTHER APPLICATIONS

This application claims the benefit under 35 U.S.C. § 120 to U.S. Nonprovisional patent application Ser. No. 16/572,527, now U.S. Pat. No. 11,410,027, entitled "PERFORMANCE ESTIMATION-BASED RESOURCE ALLOCATION FOR RECONFIGURABLE ARCHITECTURES," filed Sep. 16, 2019. This application is also related to U.S. Nonprovisional patent application Ser. No. 16/572,516 entitled "EFFICIENT EXECUTION OF OPERATION UNIT GRAPHS ON RECONFIGURABLE ARCHITECTURES BASED ON USER SPECIFICATION," filed Sep. 16, 2019. Both of the aforementioned applications are incorporated by reference for all purposes.

FIELD OF THE TECHNOLOGY DISCLOSED

The present technology relates to efficiently executing operation unit graphs on reconfigurable architectures, and can be particularly applied to efficient execution of deep neural networks on coarse-grain reconfigurable architectures and other distributed execution systems.

INCORPORATIONS

The following are incorporated by reference for all purposes as if fully set forth herein:

Koeplinger et al., "Spatial: A Language And Compiler For Application Accelerators," *Proceedings Of The 39th ACM SIGPLAN Conference On Programming Language Design And Implementation* (PLDI), Proceedings of the 43rd International Symposium on Computer Architecture, 2018;

Prabhakar et al., "Plasticine: A Reconfigurable Architecture for Parallel Patterns," ISCA '17, Jun. 24-28, 2017, Toronto, ON, Canada;

U.S. Nonprovisional patent application Ser. No. 16/239,252, filed Jan. 3, 2019, entitled, "VIRTUALIZATION OF A RECONFIGURABLE DATA PROCESSOR,";

U.S. Nonprovisional patent application Ser. No. 16/197,826, filed Nov. 21, 2018, entitled, "CONFIGURATION LOAD OF A RECONFIGURABLE DATA PROCESSOR,";

U.S. Nonprovisional patent application Ser. No. 16/198,086, filed Nov. 21, 2018, entitled, "CONFIGURATION UNLOAD OF A RECONFIGURABLE DATA PROCESSOR,";

U.S. Nonprovisional patent application Ser. No. 16/260,548, filed Jan. 29, 2019, entitled, "MATRIX NORMAL/TRANSPOSE READ AND A RECONFIGURABLE DATA PROCESSOR INCLUDING SAME,";

U.S. Nonprovisional patent application Ser. No. 16/536,192, filed Aug. 8, 2019, entitled, "COMPILER FLOW LOGIC FOR RECONFIGURABLE ARCHITECTURES,";

U.S. Nonprovisional patent application Ser. No. 16/407,675, filed May 9, 2019, entitled, "CONTROL FLOW BARRIER AND RECONFIGURABLE DATA PROCESSOR,"; and U.S. Nonprovisional patent application Ser. No. 16/504,627, filed Jul. 8, 2019, entitled, "QUIESCE RECONFIGURABLE DATA PROCESSOR,".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including field programmable gate arrays (FPGAs), can be configured to implement a variety of functions more efficiently or faster than might be achieved using a general purpose processor executing a computer program. So-called coarse-grain reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar et al., "Plasticine: A Reconfigurable Architecture for Parallel Patterns," ISCA '17, Jun. 24-28, 2017, Toronto, ON, Canada.

CGRAs are an extremely attractive platform when performance, power, or energy efficiency are paramount. A CGRA is a composition of coarse-grained reconfigurable compute and memory elements that are interconnected together in a certain topology using a reconfigurable interconnect fabric. It is referred to as coarse-grained reconfigurable because the reconfigurable components in the architecture operate at a coarser granularity such as instructions, words, and vectors of words, as opposed to fine-grained, bit-level granularity commonly found in architectures such as FPGAs. The programmable data and control paths in CGRAs make them a natural fit to exploit nested parallelism in applications, by connecting the reconfigurable compute and memory components into customized, deeply nested, and hierarchical pipelines.

Modern applications often have several levels of nested loop levels, and contain parallelism at multiple levels of nesting. For such deeply-nested loops, traditional loop pipelining methods, which focus only on bodies of the innermost loops, often exploit insufficient parallelism and contributes to poor hardware utilization, resulting in poor performance, power, or energy efficiency.

An opportunity arises to accelerate execution of operations on reconfigurable elements of CGRAs based on user-specified architectural hints that direct operational parallelism. Improved parallelization and hardware utilization may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 3 is a pattern graph written in JSON (JavaScript Object Notation), and is an example of user-specified architectural hints.

FIG. 14 depicts one implementation of a resource determination function that determines a pipeline number of the physical compute units and/or the physical memory units of the reconfigurable data processor required to process a pipeline compute load of the fused operation unit graph on the reconfigurable data processor.

FIG. 15 shows one example of determining stage compute load of a particular addition operation unit of the fused operation unit graph.

FIG. 16 shows another example of determining stage compute load of a particular matrix multiplication operation unit of the fused operation unit graph.

FIG. 18 illustrates the stage compute processing times determined for different operation units of the operation unit graph of FIG. 18 in accordance with one implementation of the technology disclosed.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Reconfigurable Data Processor

Figure 1:
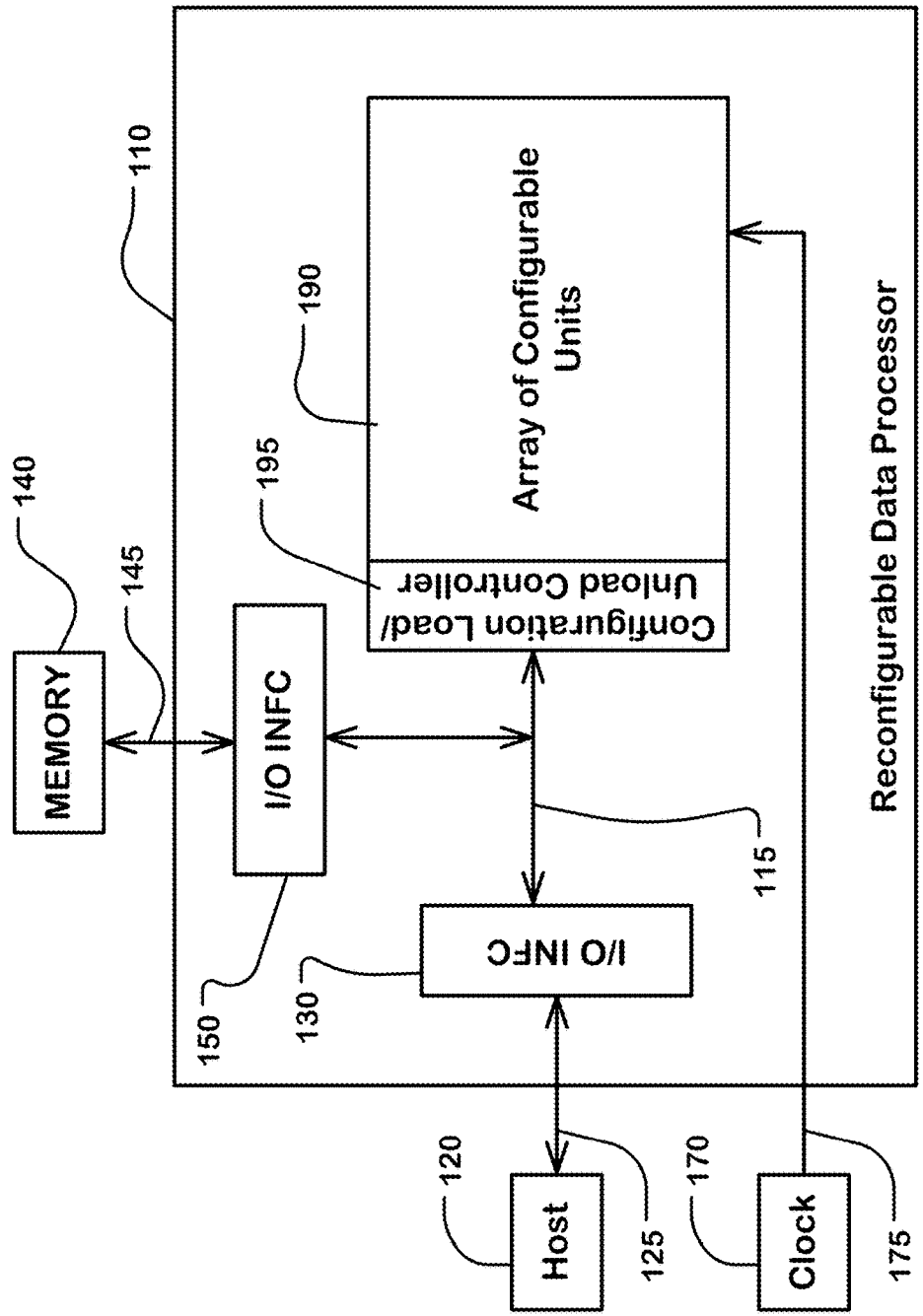
FIG. 1 is a system diagram illustrating a system including a host, a memory, and a reconfigurable data processor with an array of configurable units.

FIG. 1 is a system diagram illustrating a system including a host 120, a memory 140, and a reconfigurable data processor 110. As shown in the example of FIG. 1, the reconfigurable data processor 110 includes an array 190 of configurable units and a configuration load/unload controller 195. The phrase "configuration load/unload controller", as used herein, refers to a combination of a configuration load controller and a configuration unload controller. The configuration load controller and the configuration unload controller may be implemented using separate logic and data path resources, or may be implemented using shared logic and data path resources as suits a particular embodiment. In some embodiments, a system may include only a configuration load controller of the types described herein. In some embodiments, a system may include only a configuration unload controller of the types described herein.

Configuration of the array 190 of configurable units involves compilation of a configuration description by a compiler (not shown) to produce a configuration file, referred to sometimes as a bitstream or bit file, and distributing the configuration file to the configurable units on the array 190. In one embodiment, the compiler provides translations from application programs to bit file.

The processor 110 includes an external I/O interface 130 connected to the host 120, and external I/O interface 150 connected to the memory 140. The I/O interfaces 130, 150 connect via a bus system 115 to the array 190 of configurable units and to the configuration load/unload controller 195. The bus system 115 may have a bus width of carrying one chunk of data, which can be for this example 128 bits (references to 128 bits throughout can be considered as an example chunk size more generally). In general, a chunk of the configuration file can have a number N of bits of data, and the bus system can be configured to transfer N bits of data in one bus cycle, where N is any practical bus width. A sub-file distributed in the distribution sequence can comprise one chunk, or other amounts of data as suits a particular embodiment. Procedures are described herein using sub-files consisting of one chunk of data each. Of course, the technology can be configured to distribute sub-files of different sizes, including sub-files that may comprise two chunks distributed in two bus cycles for example.

To configure configurable units in the array 190 of configurable units with a configuration file, the host 120 can send the configuration file to the memory 140 via the interface 130, the bus system 115, and the interface 150 in the reconfigurable data processor 110. The host 120 connects to the interface 130 via the bus system 125. The memory 140 connects to the interface 150 via the bus system 145. The configuration file can be loaded in many ways, as suits a particular architecture, including in data paths outside the configurable processor 110. The configuration file can be retrieved from the memory 140 via the memory interface 150. Chunks of the configuration file can then be sent in a distribution sequence as described herein to configurable units in the array 190 of configurable units in the reconfigurable data processor 110.

An external clock generator 170 or other clock signal sources can provide a clock signal 175 or clock signals to elements in the reconfigurable data processor 110, including the array 190 of configurable units, and the bus system 115, and the external data I/O interfaces.

Fusion

Figure 2:
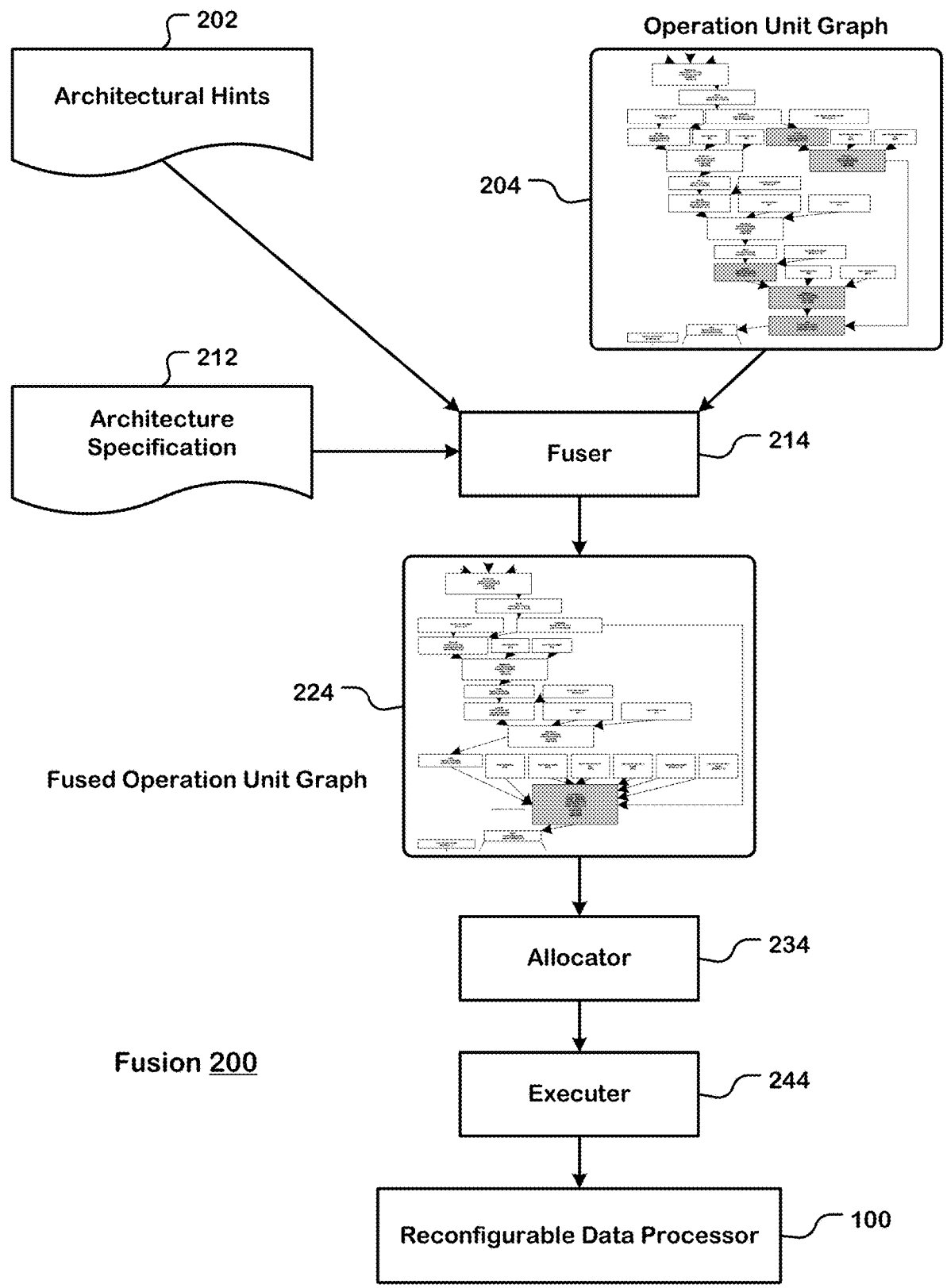
FIG. 2 is one implementation of using fusion to efficiently execute an operation unit graph on the reconfigurable data processor.

FIG. 2 is one implementation of using fusion 200 to efficiently execute an operation unit graph 204 on the reconfigurable data processor 100. Fuser 214 takes as input the operation unit graph 204, architectural hints 202, and architecture specification 212 and produces a fused operation unit graph 224.

Operation unit graph 204 is an application program or source code written in programming languages such as (but not restricted to) C, C++, Java, Python, or Spatial. For example, the operation unit graph 204 can implement convolutional neural network (CNN) processing with several layers of varying sizes and data type such that each layer comprises several nested loops with different properties. For example, the operation unit graph 204 can involve memory operations to access the inputs and weights and floating point operations to perform matrix multiplications. As another example, the operation unit graph 204 can include nested loops with high iteration count and loop bodies that load and multiply the input values from a preceding layer with the weights of a succeeding layer to produce the output of the succeeding layer. The operation unit graph 204 has loop-level parallelism of the outermost loop body that can be exploited using coarse-grained pipelining. It has instruction-level parallelism of the innermost loop body that can be similarly exploited using loop unrolling, SIMD vectorization, and pipelining.

Regarding loops, loops directly nested in a loop body are termed the child loops of the outer parent loop. A loop is called an innermost loop if it does not have any children, i.e., there are not any nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

Examples of the operation unit graph 204 include:
AlexNet
ResNet
Inception
WaveNet
PixelCNN
GoogLeNet
ENet
U-Net
BN-NIN
VGG
LeNet
Deep SEA
DeepChem
DeepBind
DeepMotif
FIDDLE
DeepLNC
DeepCpG
DeepCyTOF
SPINDLE Architectural hints 202 are specified by users such as application developers and system architects using high-level languages such as JSON, C, C++, Java, Python, or Spatial. See, Koeplinger et al., "Spatial: A Language And Compiler For Application Accelerators," *Proceedings Of The 39th ACM SIGPLAN Conference On Programming Language Design And Implementation* (PLDI), Proceedings of the 43rd International Symposium on Computer Architecture, 2018.

Figure 4:
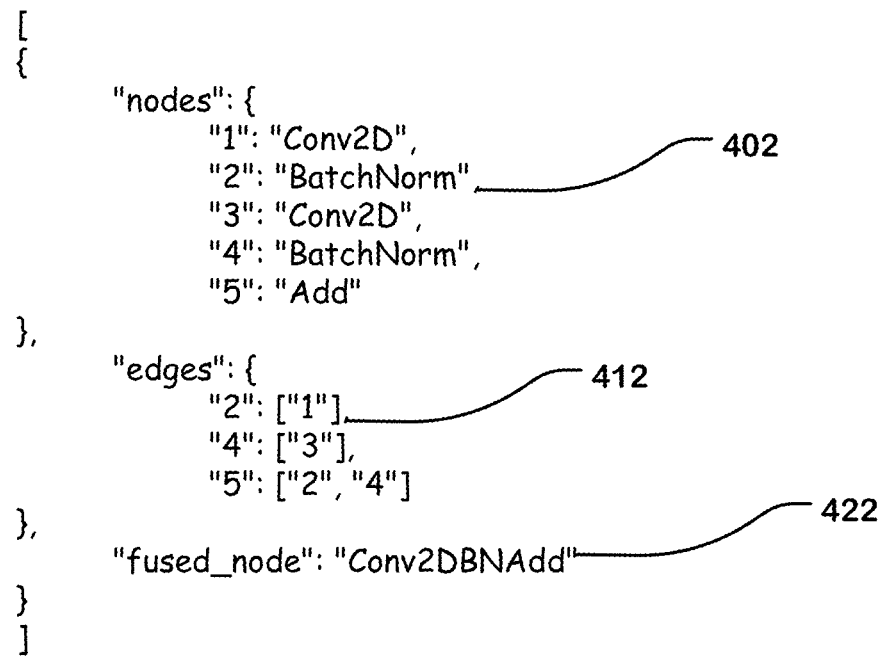
FIG. 4 is also a pattern graph written in JSON, and is another example of user-specified architectural hints.
Figure 5:
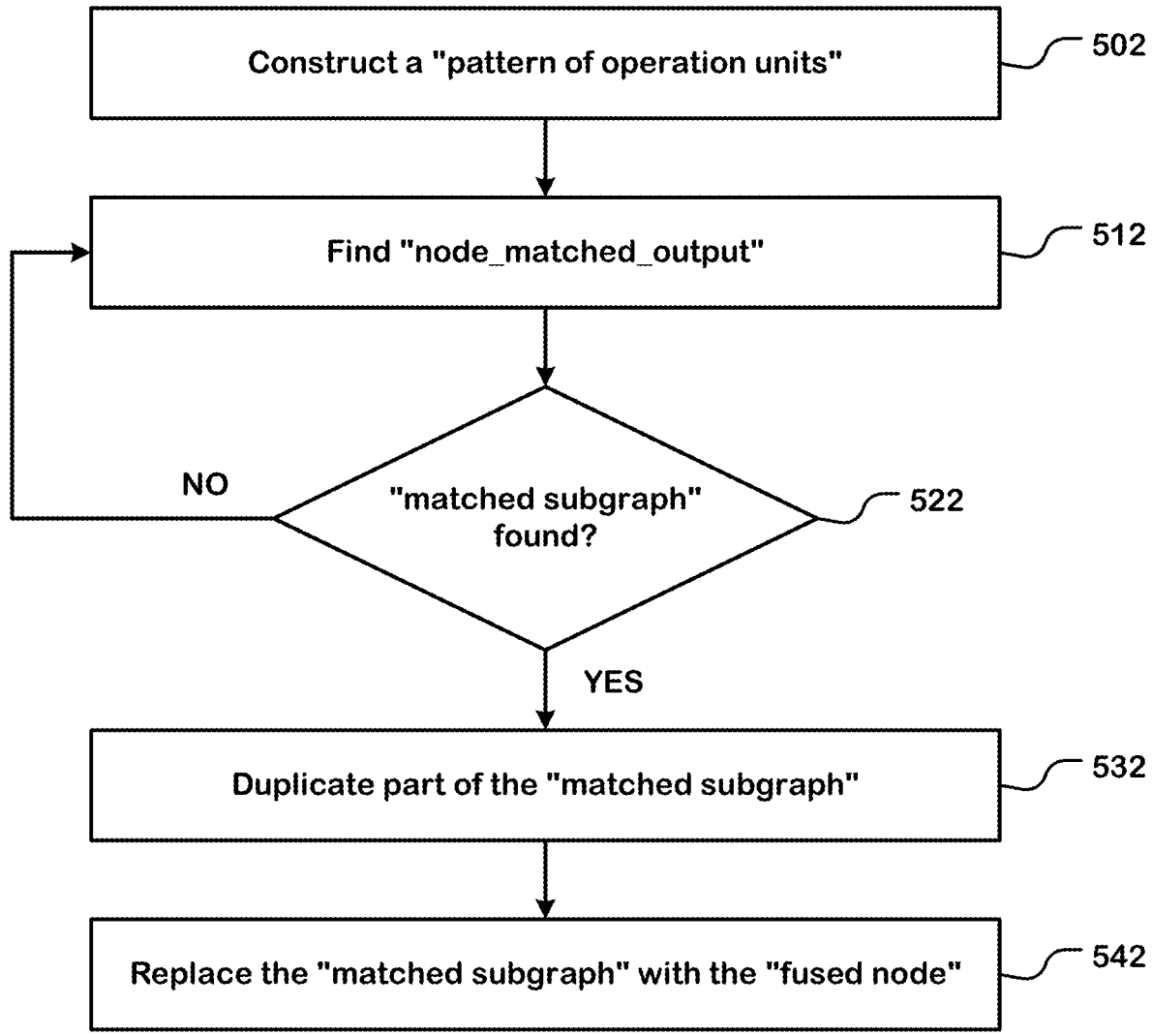
FIG. 5 depicts a fusion algorithm in accordance with one implementation of the technology disclosed.

FIGS. 3 and 4 show examples of the architectural hints 202 written in JSON. Architectural hints 202 call for fusing first operation units when executing patterns of the first operation units on the physical compute units and/or physical memory units of the reconfigurable data processor 100. Also, architectural hints 202 specify the first operation units in a pattern as first nodes and specify first dataflows among the first operation units in the pattern as first edges. Further, architectural hints 202 direct fusion among the first operation units in the pattern (e.g., 322, 332, 342, 252, 422).

In one implementation, the architectural hints 202 describe a list of node patterns that are fused into one operation which can be executed on one physical compute unit of the reconfigurable data processor 100. In some implementations, each node pattern comprises a list of nodes (their universally unique identifier (UUID) and operation type), edges describing how the nodes are connected (i.e., list of inputs of each node), and the operation type of fused node.

Pattern graph 300 is one example of the architectural hints 202. Pattern graph 300 calls for fusing 322 three operation units (Conv2DBNRelu): (1) a two-dimensional (2D) convolution operation unit (Conv2D), (2) a batch normalization operation unit (BatchNorm), and (3) a rectified linear unit (ReLU) operation unit (Relu). Pattern graph 300 specifies these three operation units as nodes 302 and specifies dataflows among these three operation units as edges 312.

Pattern graph 300 also calls for fusing 332 two operation units (Conv2DBN): (1) the 2D convolution operation unit and (2) the batch normalization operation unit. Pattern graph 300 also calls for fusing 342 two operation units (Conv2DRelu): (1) the 2D convolution operation unit and (2) the ReLU operation unit. Pattern graph 300 also calls for fusing 352 two operation units (Addmm): (1) a multiplication operation unit (Mm) and (2) an addition operation unit (Add).

Pattern graph 400 is another example of the architectural hints 202 for non-sequential patterns. Pattern graph 400 calls for fusing 422 five operation units (Conv2DBNAdd): (1) a first 2D convolution operation unit, (2) a first batch normalization operation unit, (3) a second 2D convolution operation unit, (4) a second batch normalization operation unit, and (5) an addition operation unit. Pattern graph 400 specifies these five operation units as nodes 402 and specifies dataflows among these five operation units as edges 412. Here, one physical compute unit of the reconfigurable data processor 100 performs the 2D convolution operation and the batch normalization for two sets of data and then adds their results.

Fuser 214 performs the fusion taking into account a target architecture of the reconfigurable data processor 100. The target architecture is specified in the architecture specification 212 and is provided by the user. In one implementation, the architectural hints 202 are specific to the target architecture of the reconfigurable data processor 100.

Figure 6:
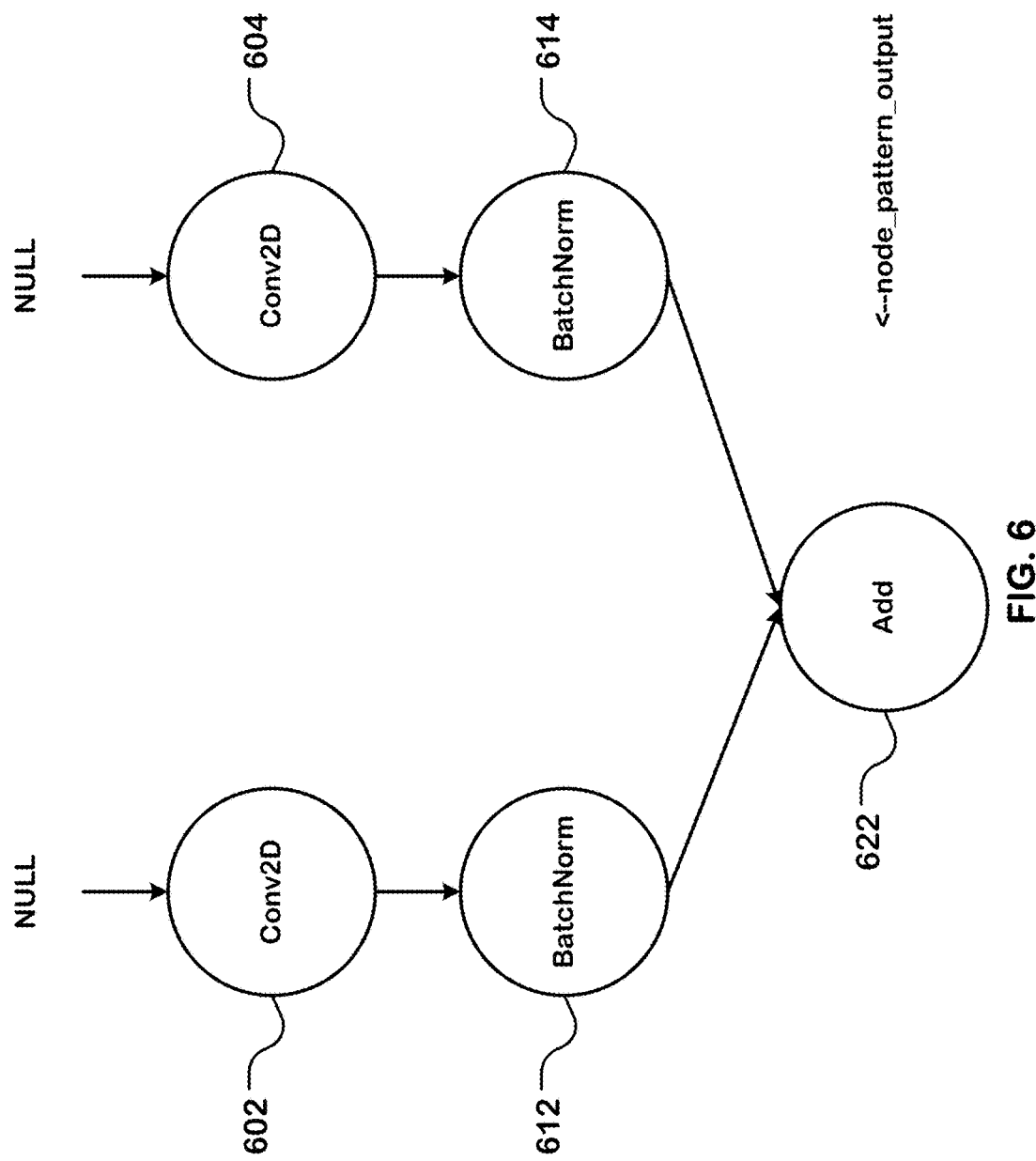
FIG. 6 shows one example of a pattern of operation units constructed by the fusion algorithm of FIG. 5.

FIG. 6 depicts a fusion algorithm 500 in accordance with one implementation of the technology disclosed. In one implementation, the fusion algorithm 500 is implemented by the fuser 214.

At action 502, the fusion algorithm 500 constructs a "pattern of operation units" based on the user-specified architecture hints 202. Nodes in the pattern of operation units represent control structures, data operations, and memory allocations, while edges represent data and effect dependencies. The pattern of operation units supports branches, loops, function calls, and other variations of control dependencies. In one implementation, each pattern of operation units can have multiple inputs, but only one output. The output node is called the "node_pattern_output." FIG. 6 shows one example 600 of the pattern of operation units with 2D convolution nodes 602, 604 and batch normalization nodes 612, 614, along with an addition output node 622 (node_pattern_output).

At action 512, the fusion algorithm 500 finds a node in the unfused operation unit graph 204 that matches the output node (e.g., addition output node 622) of the pattern of operation units. This matched node in the unfused operation unit graph 204 is called "node_matched_output."

At action 522, the fusion algorithm 500 traverses, in parallel, upward from the node_pattern_output, and from, node_matched_output, and checks if all corresponding nodes match, until every node in the pattern of operation units has been visited. If all nodes match, then a "matched subgraph" is found. If the matched subgraph is not found, then the fusion algorithm 500 goes back to action 512.

Figure 7:
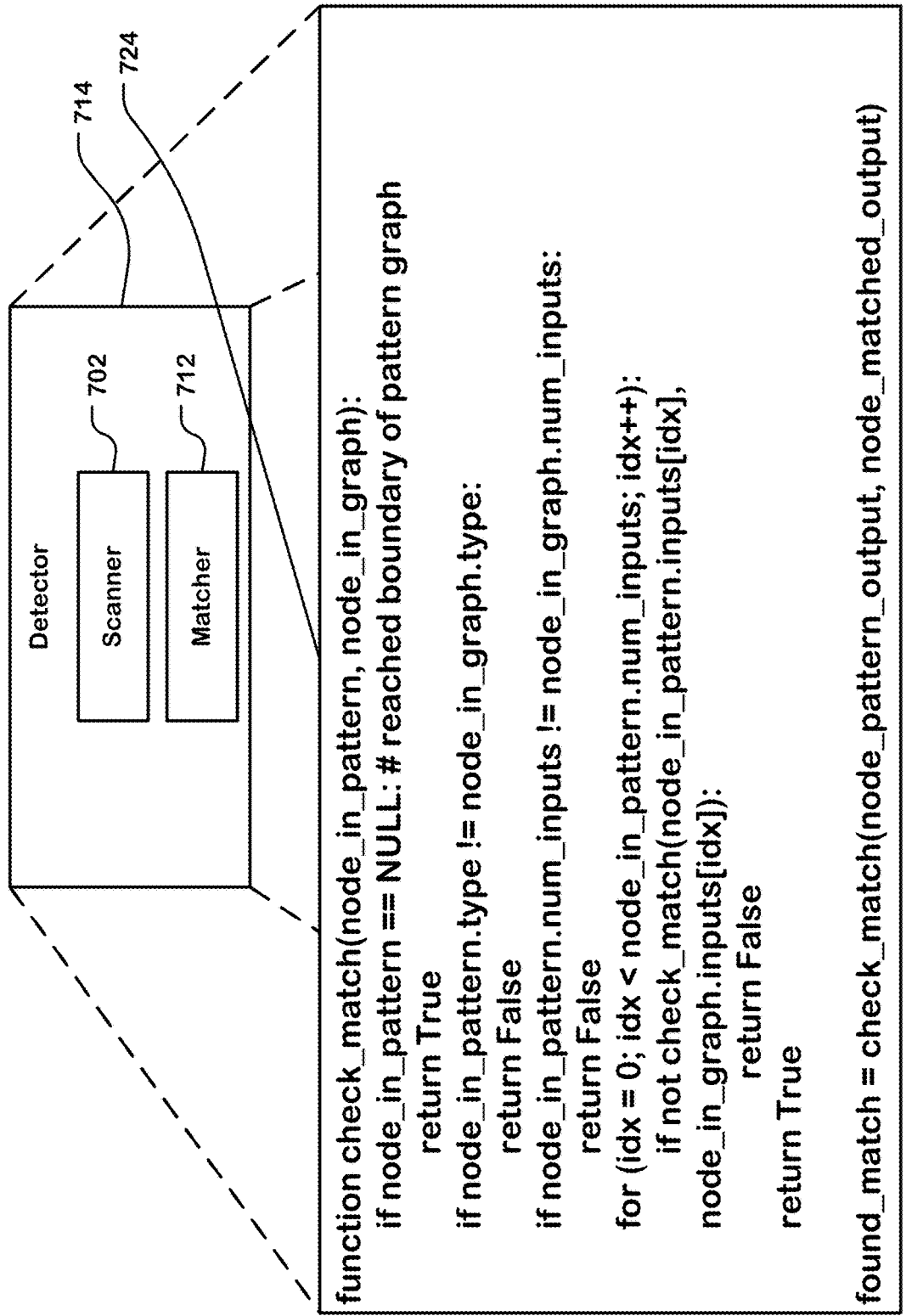
FIG. 7 is a sample code that finds pattern matches (matched subgraph) in accordance with one implementation of the technology disclosed.

In one implementation, action 522 is performed by a detector 714, which in turn comprises a scanner 702 and a matcher 712. Sample code 724 embodying the action 522 is also provided in FIG. 7 to find 700 pattern matches (the matched subgraph). Scanner 702 scans the unfused operation unit graph 204 to detect instances of the patterns of the first operation units (e.g., 322, 332, 342, 252, 422) specified by the architectural hints 202. Matcher 712 matches second nodes and second edges in the operation unit graph 204 with the first nodes and the first edges in the architectural hints 202, and detects the pattern matches (the matched subgraph).

In one implementation, action 522 comprises detecting the pattern matches by matching the first output node specified by the architectural hints 202 with a second output node in the operation unit graph 204, and beginning with the second output node in the operation unit graph 204, traversing the operation unit graph 204 to determine that the second nodes and the second edges in the operation unit graph 204 match the first nodes and the first edges in the architectural hints 202. In one implementation, the traversal is an upward traversal.

Figure 8:
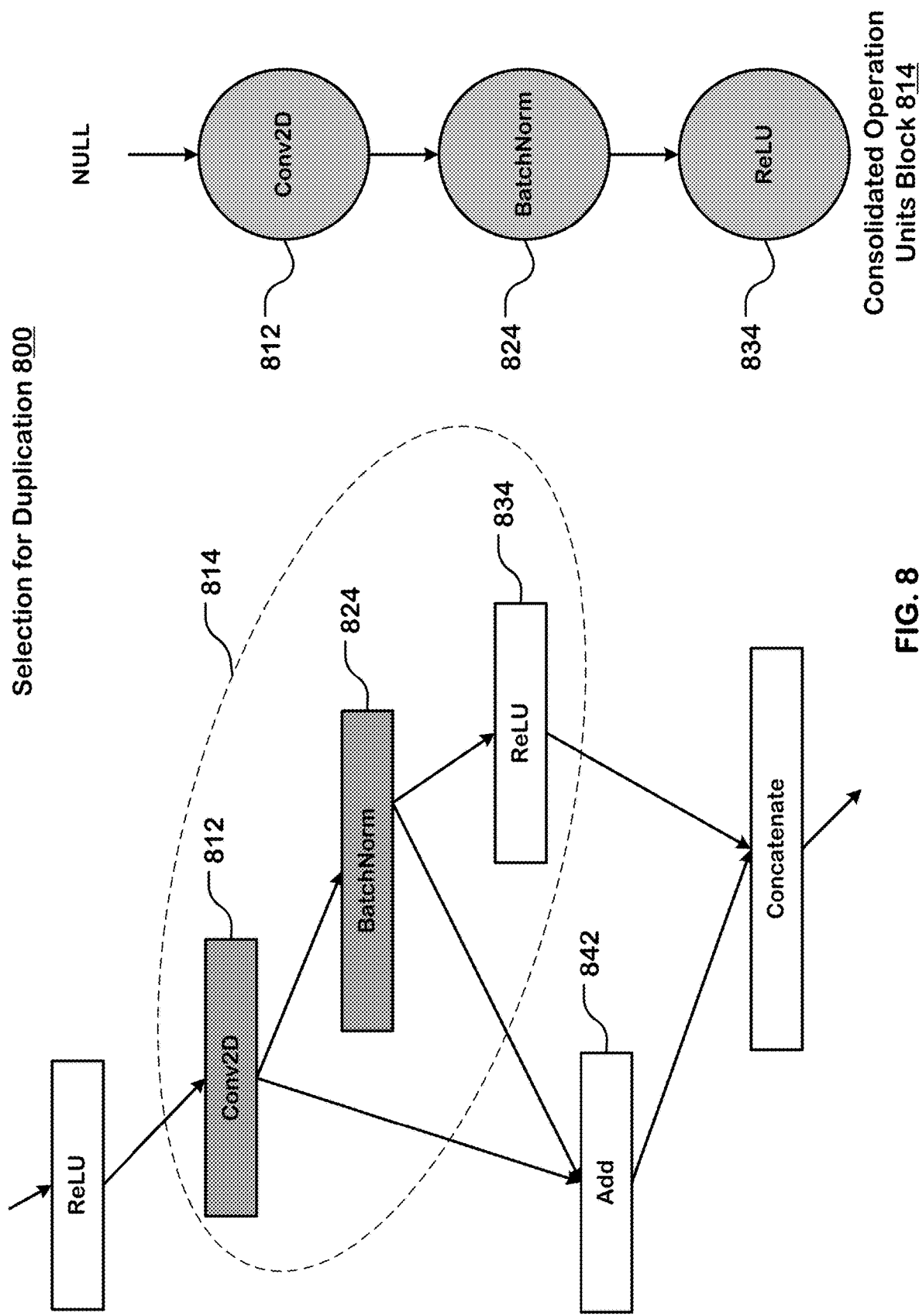
FIG. 8 depicts one implementation of selection for duplication.

At action 532, the fusion algorithm 500 duplicates part of the matched subgraph if an intermediate node in it has connections pointing outside the matched subgraph. FIG. 8 shows identifying 800 an operation unit of the operation unit graph 204 that is fused into the consolidated operation units block 814 but has a dataflow to another operation unit of the operation unit graph 204 which is outside the consolidated operation units block 814. The consolidated operation units block 814 comprises a 2D convolution operation unit (Conv2D) 812, a batch normalization operation unit (BatchNorm) 824, and a ReLU operation unit (ReLU) 834. Here, the intermediate results of the Conv2D 812 and the BatchNorm 824 are needed outside the consolidated operation units block 814 as input to an addition operation unit (Add) 842. This requires duplication of some nodes to ensure correctness after node fusion.

In one implementation, for any connection that connects an intermediate node of a matched subgraph (i.e., consolidated operation units block), the intermediate node as well as all of its ancestors in the consolidated operation units block are duplicated. In the case of the consolidated operation units block 814, such intermediate nodes are Conv2D 812 and BatchNorm 824.

Figure 9:
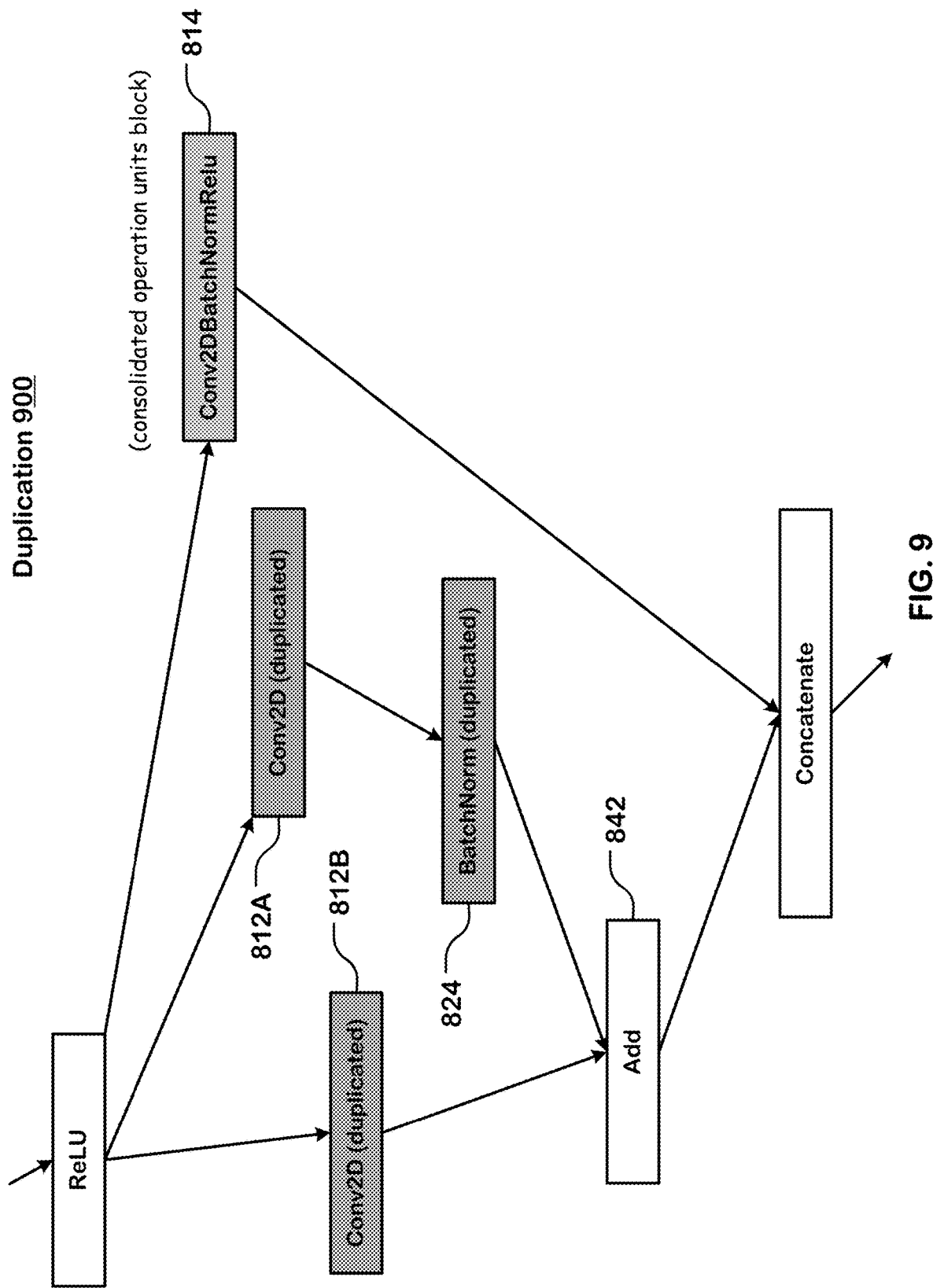
FIG. 9 depicts one implementation of duplication.

FIG. 9 shows duplicating 900 the identified operation unit (e.g., Conv2D 812A, Conv2D 812B, BatchNorm 824) and its dataflows and duplicating any other operation unit (e.g., Conv2D 812A) in the consolidated operation units block 814 that provides input to the identified operation unit (e.g., BatchNorm 824) and its dataflows.

At action 542, the fusion algorithm 500 replaces the matched subgraph with the fused node as specified by the architectural hints 202. In one implementation, the fuser 214 fuses operation units of the second nodes and the second edges in the operation unit graph 204 into a consolidated operation units block, thereby producing the fused operation unit graph 224.

An allocator 234 allocates the physical compute units and/or physical memory units of the reconfigurable data processor 100 to the fused operation unit graph 224.

An executer 244 executes the fused operation unit graph 224 on the reconfigurable data processor 100 based on the allocation.

ResNet 50 Fusion Example

Figure 10:
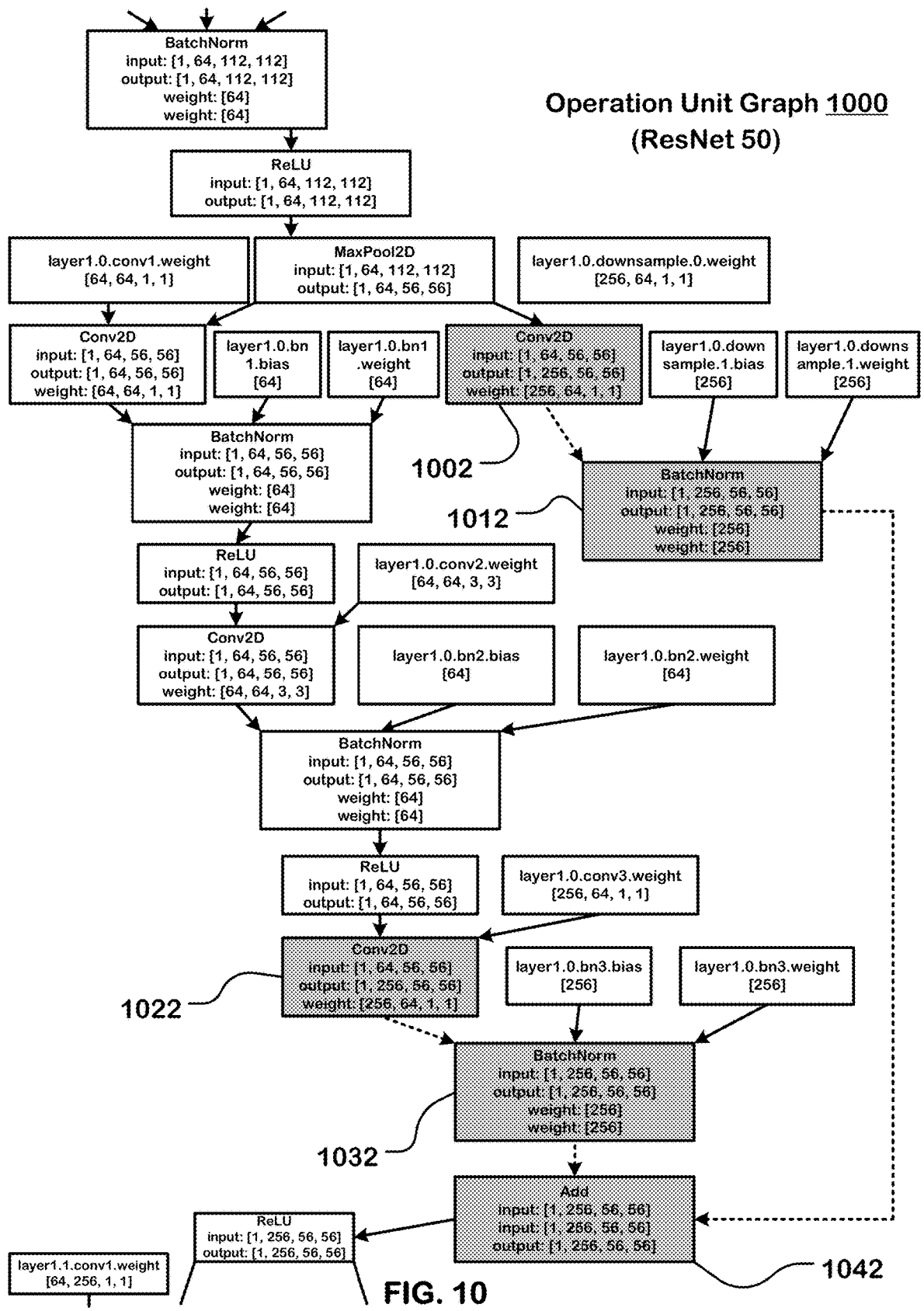
FIG. 10 shows one example of applying the fusion algorithm of FIG. 6 to a ResNet50 operation unit graph.

FIG. 10 shows one example of applying the fusion algorithm of FIG. 6 to a ResNet50 operation unit graph 1000. The fusion algorithm 500 identifies the matched subgraph comprising the Conv2D operation unit 1002, the BatchNorm operation unit 1012, the Conv2D operation unit 1022, the BatchNorm operation unit 1032, and the Add operation unit 1042, along with their dataflows (shown as dotted arrows).

Figure 11:
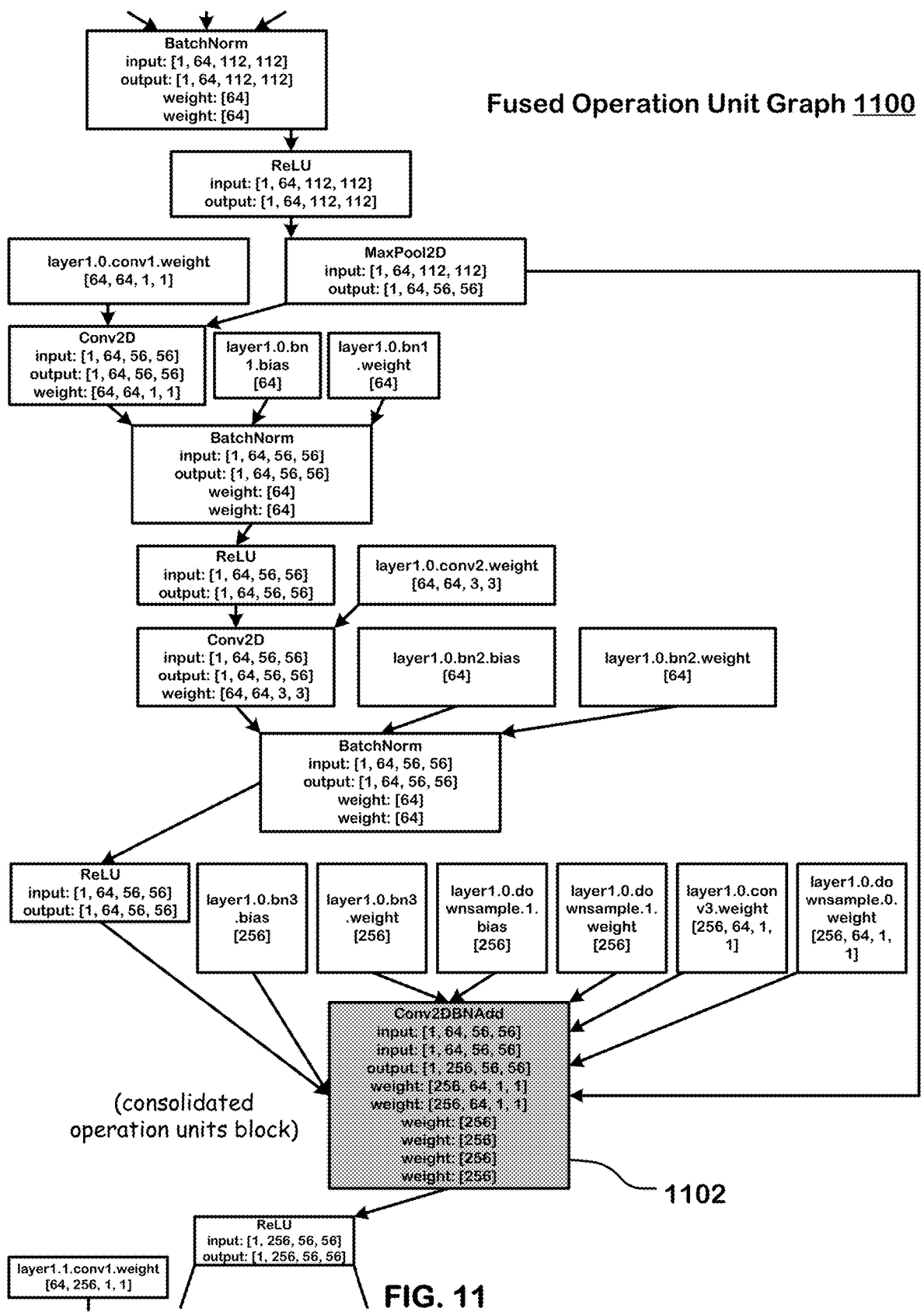
FIG. 11 shows the resulting fused ResNet50 operation unit graph.

FIG. 11 shows the resulting fused ResNet50 operation unit graph 1100 with the consolidated operation units block 1102 (i.e., the fused block).

Performance Estimation

The technology disclosed generates performance estimates for execution of an operation unit graph on the reconfigurable data processor 100. The operation unit graph can be the fused operation unit graph 224. In one implementation, the performance estimates are used for allocating available physical compute units and/or physical memory units of the reconfigurable data processor 100 to operation units of the operation unit graph for execution thereof.

Figure 12:
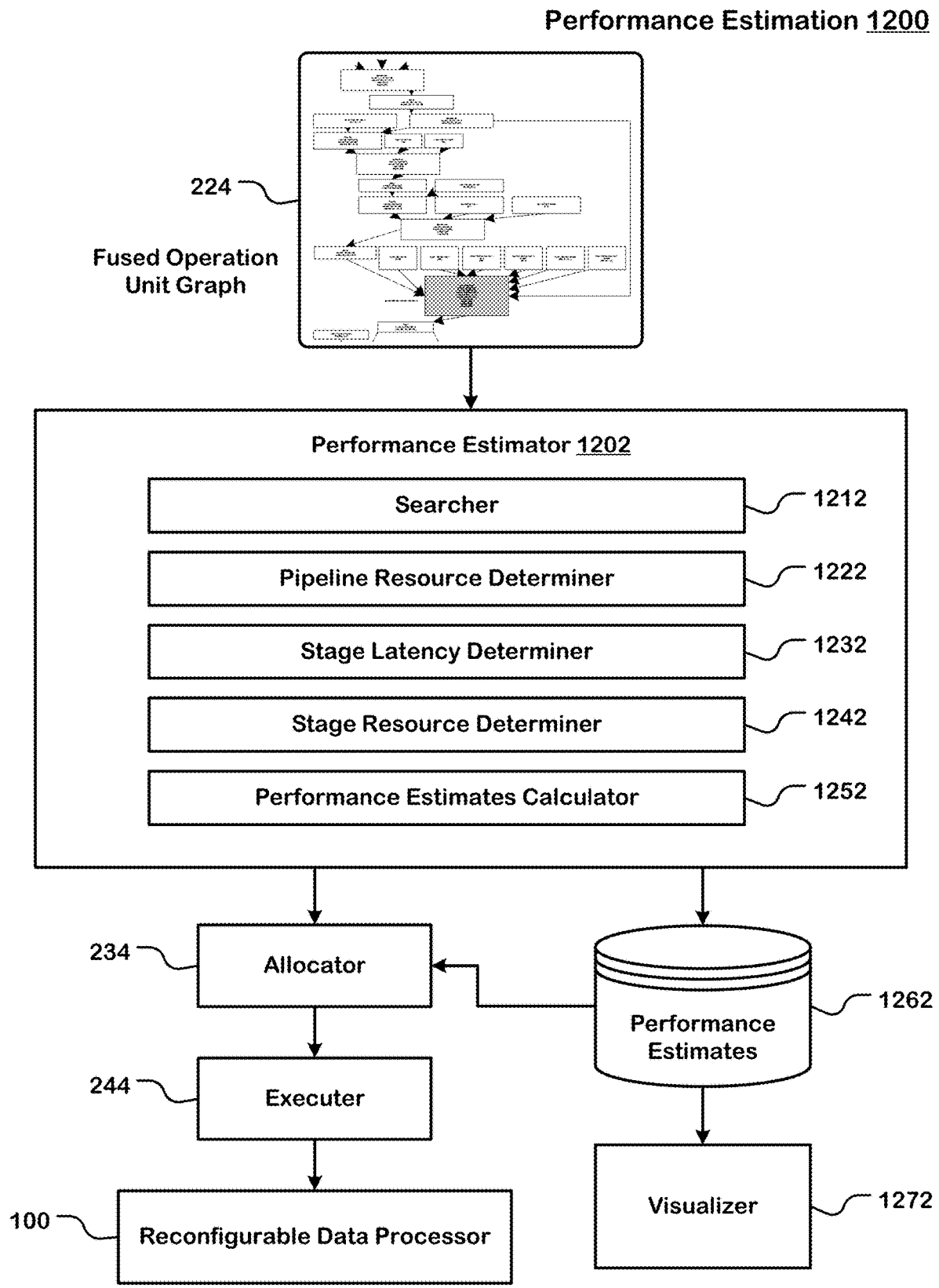
FIG. 12 illustrates one implementation of using performance estimation to allocate available physical compute units and/or physical memory units of the reconfigurable data processor to operation units of the fused operation unit graph for execution thereof.

FIG. 12 illustrates one implementation of using performance estimation 1200 to allocate available physical compute units and/or physical memory units of the reconfigurable data processor 100 to operation units of the fused operation unit graph 224 for execution thereof.

Performance estimator 1202 takes the fused operation unit graph 224 as input and generates performance estimates 1262 as output. In one implementation, the performance estimates 1262 are used to allocate the available physical compute units and/or physical memory units of the reconfigurable data processor 100 to operation units of the fused operation unit graph 224 and then to execute the fused operation unit graph 224 on the reconfigurable data processor 100.

In some implementations, a visualizer 1272 generates the performance estimates 1262 for display. The visualization can be used to convey how efficiently the fused operation unit graph 224 is executed by the reconfigurable data processor 100. The visualization can be used for comparative analysis to compare performance estimates of the fused operation unit graph 224 against performance estimates of the operation unit graph 204. The visualization can be used for comparative analysis to compare performance estimates of a first fused operation unit graph against performance estimates of a second fused operation unit graph. The visualization can be used for comparative analysis to compare performance estimates of a first operation unit graph against performance estimates of a second operation unit graph.

Performance estimator 1202 comprises a searcher 1212, a pipeline resource determiner 1222, a stage latency determiner 1232, a stage resource determiner 1242, and a performance estimates calculator 1252.

In one implementation, the performance estimates 1262 identify the throughput and the latency of executing the fused operation unit graph 224 on the reconfigurable data processor 100. In the ideal case, the chip (the reconfigurable data processor 100) utilization is hundred percent (100%), which can be formulated as:

$$\text{througput ideal} = \text{GRAPH FLOP/CHIP FLOPS},$$

where the GRAPH FLOP is the total number of floating point operations in the fused operation unit graph 224 and the CHIP FLOPS is the peak number of floating point operations that can be processed by the chip (the reconfigurable data processor 100) per second.

When hundred percent (100%) utilization of the chip (the reconfigurable data processor 100) is not achieved (e.g., due to software and hardware limitations), then:

$$\text{througput real} = \text{througput ideal} * \eta,$$

where $\eta$ is the average chip utilization.

Here, $\eta$ is a number that is dependent on the architecture of the reconfigurable data processor 100, the fused operation unit graph 224, and/or the input dimensions of the fused operation unit graph 224 and thus cannot be easily estimated. In addition, for a certain operation unit graph, the utilization of different physical compute units and/or physical memory units of the reconfigurable data processor 100 can also be different, which is dependent on the operations and data size run on a particular physical compute unit or physical memory unit. For example, a physical compute unit running convolution can achieve very high utilization, while a physical compute unit running addition can be under-utilized. These variables make accurate performance estimation challenging.

Binary Search

Figure 13:
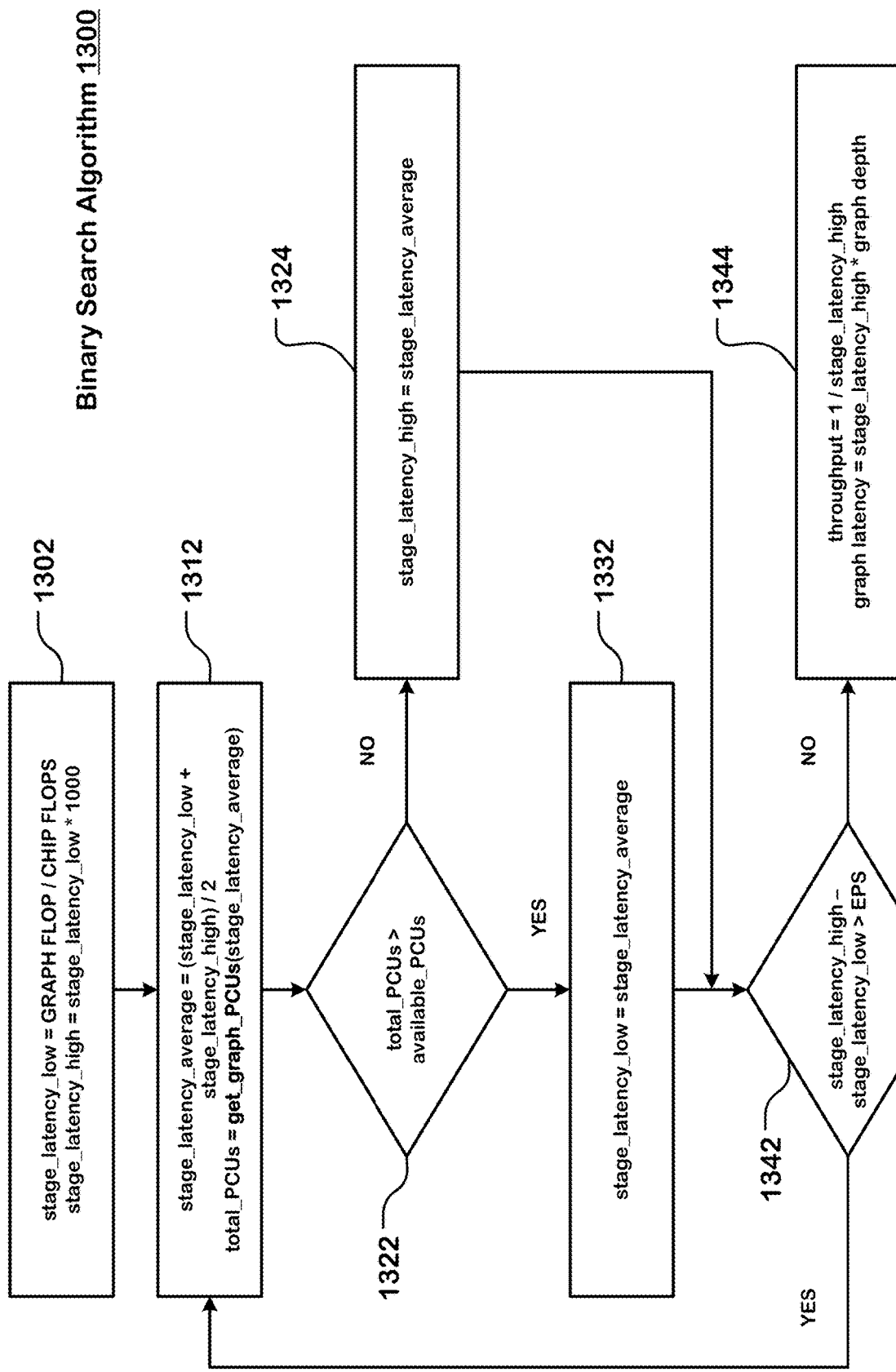
FIG. 13 shows one implementation of a binary search algorithm used to generate the performance estimates of executing the fused operation unit graph on the reconfigurable data processor.

FIG. 13 shows one implementation of a binary search algorithm 1300 used to generate the performance estimates 1262 of executing the fused operation unit graph 224 on the reconfigurable data processor 100.

Searcher 1212 determines a generic stage compute processing time ("stage_latency") required for executing an operation unit of the fused operation unit graph 224 using an iterative process through the binary search algorithm 1300. In one implementation, the searcher 1212 initializes lower ("stage_latency_low") and upper ("stage_latency_high") search bounds of the generic stage compute processing time ("stage_latency").

In one implementation, the lower search bound ("stage_latency_low") of the generic stage compute processing time ("stage_latency") can be based on maximum utilization (e.g., 100% utilization) of the reconfigurable data processor 100. This is embodied in action 1302.

In one implementation, the upper search bound ("stage_latency_high") of the generic stage compute processing time ("stage_latency") can be based on multiplying the lower search bound ("stage_latency_low") of the generic stage compute processing time ("stage_latency") with a minimum utilization factor. In some implementations, the minimum utilization factor is one hundred and thus the minimum utilization is 1%. In other implementations, the initial value of the upper search bound ("stage_latency_high") is set to 1000× of the lower search bound ("stage_latency_low"), which is also equal to 0.1% utilization. This is also embodied in action 1302.

Then, searcher 1212 selects, for evaluation, an intermediate stage compute processing time between the lower ("stage_latency_low") and upper ("stage_latency_high") search bounds of the generic stage compute processing time ("stage_latency"). In one implementation, the intermediate stage compute processing time can be an average ("stage_latency_average") of the lower ("stage_latency_low") and upper ("stage_latency_high") search bounds of the generic stage compute processing time ("stage_latency"). This is embodied in action 1312.

Pipeline resource determiner 1222 then determines a pipeline number 1432 ("total_PCUs") of the physical compute units and/or the physical memory units required to process a pipeline compute load of the fused operation unit graph 224 on the reconfigurable data processor 100.

Stage Compute Load

Turning to FIG. 14, for each of the operation units ("for node in fused_graph") of the fused operation unit graph 224, the stage latency determiner 1232 performs resource determination 1400 by using a resource determination function (e.g., "get_graph_PCUs" 1402) to determine a specific stage compute processing time 1414 ("node_latency_with_one_PCU") required to process a stage compute load 1424 ("node.get_flop( )") of a respective one of the operation units of the fused operation unit graph 224 using only one physical compute unit and/or only one physical memory unit.

The stage compute load 1424 ("node.get_flop( )") of the respective one of the operation units, which means a total number of floating point operations (FLOP) required to execute the respective one of the operation units, is determined by its operation type, input dimensionality, and output dimensionality.

For example, in FIG. 15, the stage compute load 1500 for an addition operation unit is determined by first calculating the total number of FLOP 1502 as a function of the output size. That is, one operation generates one output number. Then, an input size 1512 is calculated based on the tensor shape.

In one implementation of the reconfigurable data processor 100, a physical compute unit has thirty-two lanes and six stages, with a total of one-hundred and ninety-six (32×6) arithmetic logic units (ALUs). Each ALU can perform two operations per cycle and can finish one multiply-and-add in one cycle. This is embodied as "n_passes" 1522.

The addition operation unit is only able to use one stage, thus the "/config.PCU_N_STAGES" parameter 1536 is included in the "PCU_utilization" formula 1532. The other component 1534 of the PCU_utilizaiton calculation 1532 is due to the fact that the addition may not be able to leverage all the lanes. For example, if we have thirty-two numbers adding thirty-two numbers, we can leverage thirty-two lanes (in parallel). However, if we have forty numbers, we will load thirty-two numbers first, and then eight numbers, thus the utilization will be multiplied by (forty/sixty-four).

In another example, in FIG. 16, the stage compute load 1600 for a matrix multiplication operation unit is determined by first calculating the total number of FLOP 1602 as a function of the output size M*N. That is, for each output element, we need to do K multiply-and-add operations, thus the total FLOP is M*N*(K*2).

Using one physical compute unit, we can parallelize across thirty-two lanes in the M dimension, and parallelize across six stages in the N dimension, as embodied in 1612.

So, if we have M=sixty-four, K=hundred, and N=twelve, then we can achieve hundred percent utilization 1622 by dividing the first matrix into two thirty-two by hundred (32×100) chunks, and the second matrix into two hundred by six (200×6) chunks. However, if M=sixteen, K=hundred, and N=three, then we can only get twenty-five percent utilization 1622.

Stage Compute Processing Time

Finally, the specific stage compute processing time 1414 ("node_latency_with_one_PCU") is determined as a ratio of the utilization and the capability of the only one physical compute unit and/or only one physical memory unit (the latter can be a constant for a specific processor/chip/hardware).

Stage Resources

Stage resource determiner 1242 determines a stage number 1432 ("node_PCUs") of the physical compute units and/or the physical memory units required to process the stage compute load 1424 ("node.get_flop( )") of the respective one of the operation units by dividing the specific stage compute processing time 1414 ("node_latency_with_one_PCU") with the intermediate stage compute processing time 1434 (e.g., "stage_latency_average").

In one implementation, stage resource determine 1242 determines the stage number 1432 ("node_PCUs") of the physical compute units and/or the physical memory units required to process the stage compute load 1424 ("node.get_flop( )") by rounding up to an integer which is a result of dividing the stage compute processing time 1414 ("node_latency_with_one_PCU") with the intermediate stage compute processing time 1432 (e.g., "stage_latency_average"). This is embodied by the ceiling function 1433.

Pipeline Resources

Pipeline resource determiner 1222 sums the stage number 1432 ("node_PCUs") of the physical compute units and/or the physical memory units for each of the operation units and produces the pipeline number 1442 ("total_PCUs") of the physical compute units and/or the physical memory units. This is also embodied in action 1312 of FIG. 13.

In one implementation, for each node, we first calculate its latency if only one PCU is used. This requires building a node library that has a modeling of each operation (e.g. Conv, Add), so that we know how to compute FLOP and utilization of each operation given the input and output size. We then look at the ratio between this latency (with one PCU) and our target stage_latency to determine how many PCUs are needed to parallelize this operation. The total PCUs for the graph is then the summation of the PCUs allocated to each node.

Iteration

Searcher 1212 then iteratively initializes new lower ("stage_latency_low") and upper ("stage_latency_high") search bounds of the generic stage compute processing time ("stage_latency") and selects, for evaluation in a next iteration, a new intermediate stage compute processing time between the new lower and upper search bounds of the generic stage compute processing time ("stage_latency") taking into account whether the pipeline number 1432 ("total_PCUs") of the physical compute units and/or the physical memory units produced for a prior intermediate stage compute processing time in a previous iteration is lower or higher than the available (available_PCUs) physical compute units and/or physical memory unit. This is embodied in action 1322.

In one implementation, when the pipeline number 1432 ("total_PCUs") of the physical compute units and/or the physical memory units produced for the prior intermediate stage compute processing time in the previous iteration is lower than the available (available_PCUs) physical compute units and/or physical memory units, the searcher 1212 sets the new upper ("stage_latency_high") search bound for the next iteration as the prior intermediate stage compute processing time (e.g., "stage_latency_average"). This is embodied in action 1324.

In one implementation, when the pipeline number 1432 ("total_PCUs") of the physical compute units and/or the physical memory units produced for the prior intermediate stage compute processing time in the previous iteration is higher than the available (available_PCUs) physical compute units and/or physical memory units, the searcher 1212 sets the new lower ("stage_latency_low") search bound for the next iteration as the prior intermediate stage compute processing time (e.g., "stage_latency_average"). This is embodied in action 1332.

In one implementation, in each iteration, we pick the middle point of the upper and lower bound (stage_latency_average), and get an estimation of total PCUs needed to achieve such stage latency through the get_graph_PCUs function call. If the total number of PCUs exceeds the PCUs available, we need to increase stage latency (let stage_latency_low=stage_latency_average). Otherwise, we have more compute resource to spend to further improve performance, thus we try to reduce stage latency (let stage_latency_high=stage_latency_average).

Termination

Searcher 1212 terminates the iterative initializing and selecting when the pipeline number 1432 ("total_PCUs") of the physical compute units and/or the physical memory units produced for a current intermediate stage compute processing time in a current iteration meets a convergence criteria. In one implementation, the convergence criteria transpires when the difference between the upper search bound and the lower search bound goes below a threshold. This is embodied in action 1342. In one implementation, searcher 1212 continues the iterative initializing and selecting as long as the difference between the upper search bound and the lower search bound is above a threshold.

Throughput & Latency

Performance estimates calculator 1252 calculates the pipeline throughput as an inverse function of the current intermediate stage compute processing time, and calculates the graph latency by multiplying the stage compute processing time with the number of operation units ("graph depth") in the fused operation graph 224. This is embodied in action 1344.

Generic Performance Estimation Example

Figure 17:
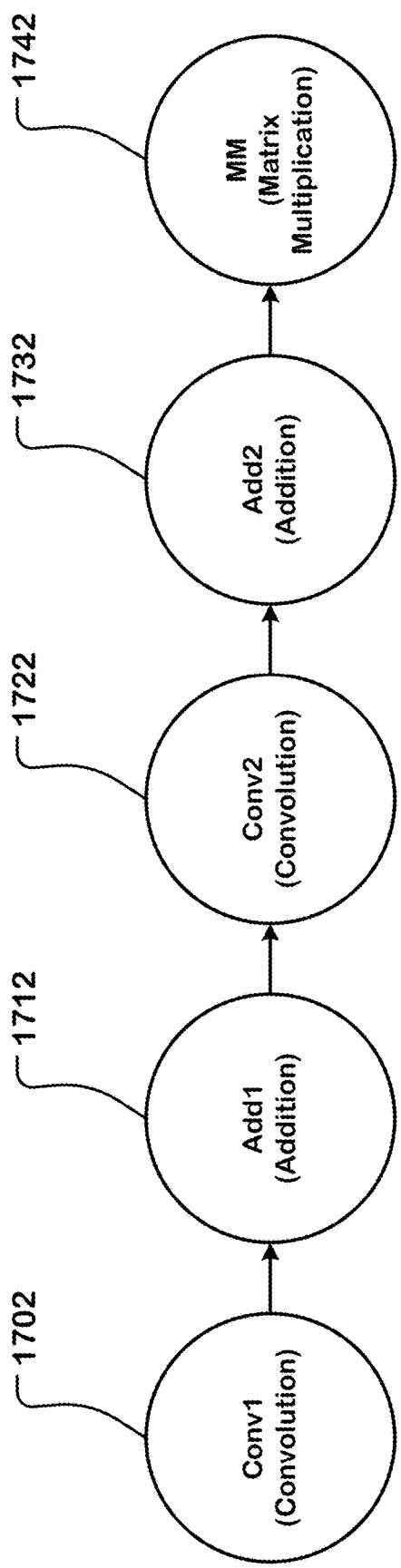
FIG. 17 depicts an example operation unit graph for which the performance estimates are determined in accordance with one implementation of the technology disclosed.

FIG. 17 depicts an example operation unit graph 1700 for which the performance estimates are determined in accordance with one implementation of the technology disclosed.

In a spatial architecture, node operations are pipelined. In other words, each node is a stage in a pipeline and the length of the pipeline is the depth of the graph. For example, in operation unit graph 1700, there are five nodes/stages/operation units in the pipeline. While the PCUs allocated to the second operation "Add1" is applying addition to the n'th sample, the PCUs for the first operation "Conv1" 1702 is performing convolution for the n+1'th sample (and Conv2 is operation on n−1'th sample, etc.).

FIG. 18 illustrates the stage compute processing times 1800 determined for different operation units 1702, 1712, 1722, 1732, and 1742 of the operation unit graph 1700 of FIG. 17 in accordance with one implementation of the technology disclosed. The values in the columns 1802 and 1812 are determined based on the stage compute load and stage compute processing time embodiments discussed above in the similarly named sections that are taken into account if only one PCU and/or PCU is allocated to each node/operation unit/stage.

Let's assume we have 40 PCUs available (available_PCUs). Suppose our current search range for stage latency is 4 us (stage_latency_low) and 12 us (stage_latency_high). We pick the middle point, which is (4+12)/2=8 us (stage_latency_average). For Conv1 1702 to achieve 8 us, we need to parallelize it 200/8=25 ways. Thus, we assign 25 PCUs to Conv1 1702. Similarly, we assign ceil(18/8)=3 PCUs to Add1 1712, ceil(110/8)=14 PCUs to Conv2 1722, ceil(9/8) =2 PCUs to Add2 1732, and ceil(50/8)=7 PCUs to MM 1742. The total PCUs used is 25+3+14+2+7=51 (total PUCs), greater than the available 40 (available PCUs).

Thus, we increase stage latency by letting stage_latency_low=8 us, and the next middle point to try will be (8+12)/2=10 us. The binary search algorithm 1300 finally converges to 11 us as the optimal stage latency. Based on this, the estimated throughput is 1/11 us=90,909 samples/s. The graph latency is 11 us*5=55 us.

Reconfigurable Tile

Figure 19B:
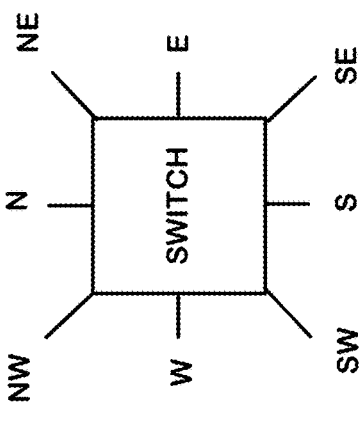
FIG. 19B illustrates an example switch unit connecting elements in the array level network.
Figure 19A:
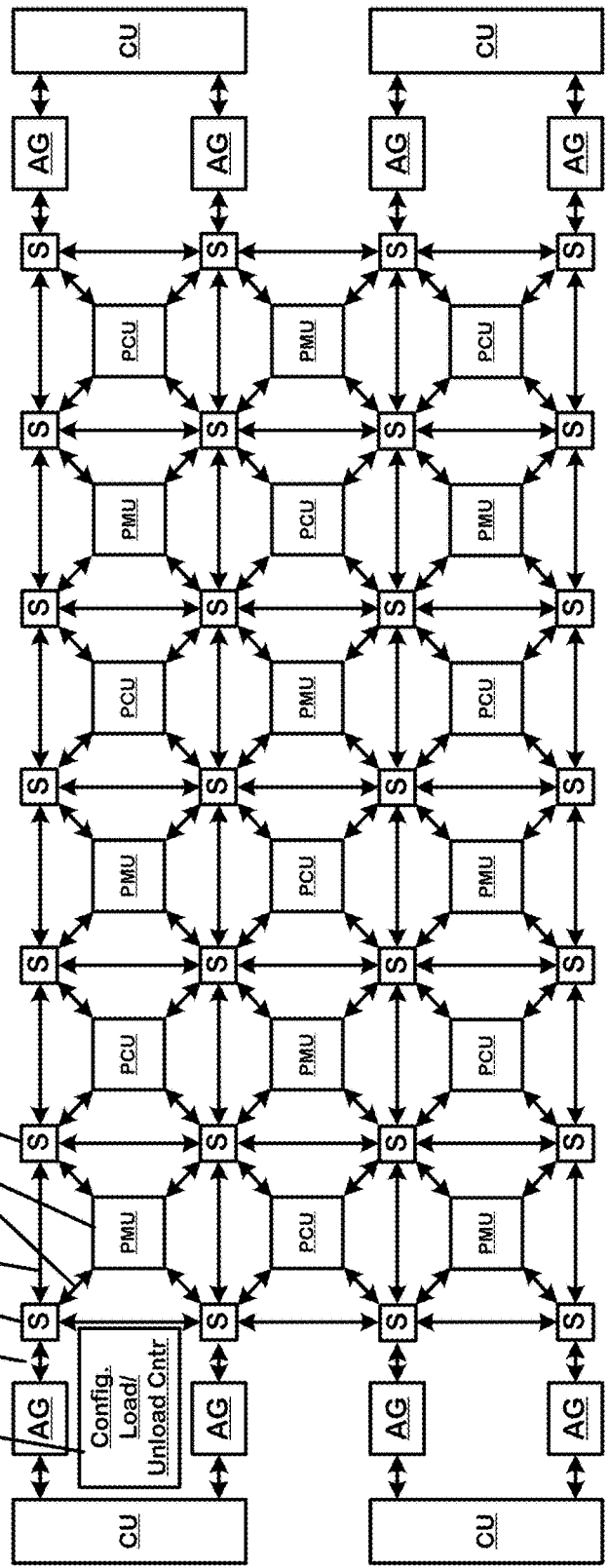
FIG. 19A is a simplified diagram of a tile and an array level network usable in the reconfigurable data processor of FIG. 1.

FIG. 19A is a simplified diagram 1900 of a tile and an array level network usable in the reconfigurable data processor of FIG. 1. FIG. 19B illustrates an example switch unit connecting elements in the array level network. In this example, the array of configurable units 300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns," ISCA '17, Jun. 24-28, 2017, Toronto, ON, Canada, which is incorporated by reference as if fully set forth herein.

Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status used to track progress in nested loops or otherwise. The configuration file contains a bitstream representing the initial configuration, or starting state, of each of the components that execute the program. This bitstream is referred to as a bit file. Program load is the process of setting up the configuration stores in the array 190 of configurable units based on the contents of the bit file to allow all the components to execute a program (i.e., a machine). Program Load may also require the load of all PMU memories.

The array level network includes links interconnecting configurable units in the array. The links in the array level network include one or more and, in this case three, kinds of physical buses: a chunk-level vector bus (e.g. 128 bits of data), a word-level scalar bus (e.g. 32 bits of data), and a multiple bit-level control bus. For instance, interconnect 1921 between switch units 1911 and 1912 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array 190 of configurable units.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.

Bits that form a chunk number.

Bits that indicate a column identifier.

Bits that indicate a row identifier.

Bits that indicate a component identifier.

For a load operation, the configuration load controller can send the number N of chunks to a configurable unit in order from N−1 to 0. For this example, the 6 chunks are sent out in most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 19B illustrates an example switch unit connecting elements in the array level network. As shown in the example of FIG. 19B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 1941 can be sent from the configuration load/unload controller 1901 to the PMU 1941, via a link 1922 between the configuration load/unload controller 1901 and the West (W) vector interface of the switch unit 1911, the switch unit 1911, and a link 1931 between the Southeast (SE) vector interface of the switch unit 1911 and the PMU 1941.

In this example, one of the AGCUs is configured to be a master AGCU, which includes a configuration load/unload controller (e.g. 1901). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 19A). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 1). Each of the memory interfaces can be accessed using several AGCUs. Each AGCU contains a reconfigurable datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions, and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit can use a coalescing cache to maintain metadata on issued off-chip memory requests to combine sparse addresses that belong to the same off-chip memory request to minimize the number of issued off-chip memory requests.

Reconfigurable Units

Figure 20:
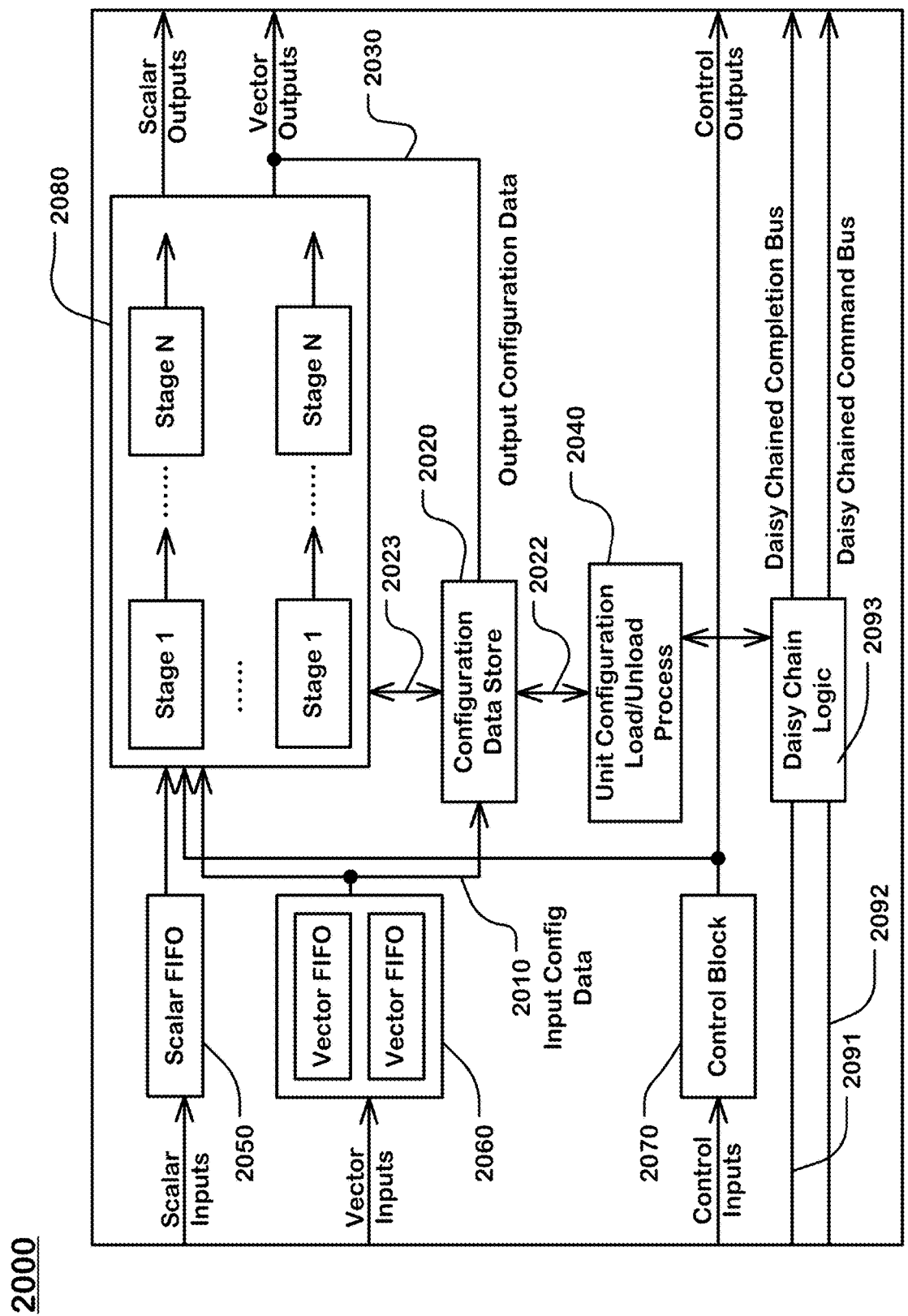
FIG. 20 is a block diagram illustrating an example configurable unit.

FIG. 20 is a block diagram illustrating an example configurable unit 2000, such as a Pattern Compute Unit (PCU). In the context of this application, a PCU corresponds to a physical compute unit. Configurable units in the array of configurable units include configuration data stores 2020 (e.g. serial chains) to store unit files comprising a plurality of chunks (or sub-files of other sizes) of configuration data particular to the corresponding configurable units. Configurable units in the array of configurable units each include unit configuration load logic 2040 connected to the configuration data store 2020 via line 2022, to execute a unit configuration load process. The unit configuration load process includes, receiving via the bus system (e.g. the vector inputs), chunks of a unit file particular to the configurable unit, and loading the received chunks into the configuration data store 2020 of the configurable unit.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

A configurable unit can interface with the scalar, vector, and control buses using three corresponding sets of inputs and outputs (IO): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process, and transmitting and receiving data during operation after configuration across a long pipeline between multiple PCUs. Control IOs can be used to communicate control signals such as the start or end of execution of a configurable unit. Control inputs are received by control block 2070, and control outputs are provided by the control block 2070.

Each vector input is buffered using a vector FIFO in a vector FIFO block 2060 which can include one or more vector FIFOs. Each scalar input is buffered using a scalar FIFO 2050. Using input FIFOs decouples timing between data producers and consumers, and simplifies inter-configurable-unit control logic by making it robust to input delay mismatches.

Input configuration data 2010 can be provided to a vector FIFO as vector inputs, and then be transferred to the configuration data store 2020. Output configuration data 2030 can be unloaded from the configuration data store 2020 using the vector outputs.

The CGRA uses a daisy chained completion bus to indicate when a load/unload command has been completed. The master AGCU transmits the program load and unload commands to configurable units in the array of configurable units over a daisy-chained command bus. As shown in the example of FIG. 20, a daisy chained completion bus 2091 and a daisy chained command bus 2092 are connected to daisy chain logic 2093, which communicates with the unit configuration load logic 2040. The daisy chain logic 2093 can include load complete status logic, as described below. The daisy chained completion bus is further described below. Other topologies for the command and completion buses are clearly possible but not described here.

A configurable unit includes multiple reconfigurable datapaths in block 2080. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 2020 is connected to the multiple datapaths in block 2080 via lines 2023.

In the context of this application, a pattern memory unit (PMU) corresponds to a physical memory unit. A PMU can contain scratchpad memory coupled with a reconfigurable datapath intended for address calculation, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU. Each PMU contains a programmer-managed scratchpad memory coupled with a reconfigurable datapath intended primarily for address calculation, and other compute operations as required by the program. PMUs are used to distribute on-chip memory throughout the array 190. The array architecture makes a distinction between the operations involved in memory addresses calculation and the core computation underlying applications. Address calculation is performed on the PMU datapath, while the core computation is performed within the PCU. Several observations have motivated this design choice: (i) address calculation involves simple scalar math, which requires simpler ALUs than the ALUs in PCUs; (ii) Using multiple lanes for address computation is often unnecessary for most on-chip access patterns; and (iii) Performing address calculation within the PCU requires routing the addresses from the PCU to the PMU, which occupies PCU stages and output links, and can lead to PCU under-utilization.

PCUs and PMUs (collectively "units") communicate with three kinds of interconnect: word-level scalar, multiple-word-level vector, and bit-level control interconnects. The array 190 of configurable units interfaces with DRAM through multiple DDR channels. Each channel has an associated address management unit that arbitrates between multiple address streams, and consists of buffers to support multiple outstanding memory requests and address coalescing to minimize DRAM accesses. Local address calculation is done in PMUs, DRAM address computation happens in the DRAM address management units, and the remaining data computation happens in PCUs. The scratchpads are built with multiple SRAM banks matching the number of PCU lanes. Address decoding logic around the scratchpad can be configured to operate in several banking modes to support various access patterns. Strided banking mode supports linear access patterns often found on dense data structures. FIFO mode supports streaming accesses. Line buffer mode captures access patterns resembling a sliding window. Duplication mode, where the contents are duplicated across all memory banks, provides multiple read address channels to support parallelized on-chip gather operations.

The PCU is designed to execute innermost parallel patterns in an application. The PCU datapath is organized as a multi-stage, reconfigurable SIMD pipeline. This design enables each PCU to achieve high compute density, and exploit both loop-level parallelism across lanes and pipeline parallelism across stages. Each stage of each SIMD lane is composed of a functional unit (FU) and associated pipeline registers (PR). FUs perform 32 bit word-level arithmetic and binary operations, including support for floating point and integer operations. As the FUs in a single pipeline stage operate in SIMD, each stage requires only a single configuration register. Results from each FU are written to its associated register. PRs in each lane are chained together across pipeline stages to allow live values to propagate between stages within the same lane. Cross-lane communication between FUs is captured using two types of intra-PCU networks: a reduction tree network that allows reducing values from multiple lanes into a single scalar, and a shift network which allows using PRs as sliding windows across stages to exploit reuse in stencil applications. Both networks use dedicated registers within PRs to minimize hardware overhead.

PCUs interface with the global interconnect using three kinds of inputs and outputs (IO); scalar, vector, and control. Scalar IO is used to communicate single words of data, such as the results of Folds. Each vector IO allows communicating one word per lane in the PCU, and is used in cases such as reading and writing to scratchpads in PMUs and transmitting intermediate data across a long pipeline between multiple PCUs. Each vector and scalar input is buffered using a small FIFO. Using input FIFOs decouples data producers and consumers, and simplifies inter-PCU control logic by making it robust to input delay mismatches. Control IO is used to communicate control signals such as the start or end of execution of a PCU, or to indicate backpressure.

A reconfigurable chain of counters generates pattern iteration indices and control signals to coordinate execution. PCU execution begins when the control block enables one of the counters. Based on the application's control and data dependencies, the control block can be configured to combine multiple control signals from both local FIFOs and global control inputs to trigger PCU execution. The control block is implemented using reconfigurable combinational logic and programmable up-down counters for state machines.

Just as banking is important to feed multiple SIMD units to sustain compute throughput, N-buffering, or generalized double buffering, is just as important to support coarse-grained pipelines. As an example, the skip connections in ResNet, and the buffers that hold the outputs of each layer can be implemented using N-buffering. The PMU scratchpad can be configured to operate as an N-buffer with any of the banking modes described. N-buffers are implemented by partitioning the address space in each SRAM bank into N disjoint regions. Using write and read state information, an appropriate offset is added to each bank's local address to access the correct data.

A programmable counter chain and control block triggers PMU execution similar to the PCU. Each PMU typically contains write address calculation logic from the producer pattern, and read address calculation logic from the consumer pattern. Based on the state of the local FIFOs and external control inputs, the control block can be configured to trigger the write address computation, read address computation, or both, by enabling the appropriate counters.

Particular Implementations

In one implementation, we disclose a computer-implemented method of efficiently executing an operation unit graph on a reconfigurable data processor with a target architecture. The method includes reducing a number of physical compute units and/or physical memory units of the reconfigurable data processor required to execute the operation unit graph.

The method includes receiving, from a user, architectural hints that are specific to the target architecture of the reconfigurable data processor. The architectural hints call for fusing first operation units when executing patterns of the first operation units on the physical compute units and/or physical memory units of the reconfigurable data processor, specify the first operation units in a pattern as first nodes, specify first dataflows among the first operation units in the pattern as first edges, and direct fusion among the first operation units in the pattern The method includes scanning the operation unit graph to detect instances of the patterns of the first operation units specified by the architectural hints. This further includes matching second nodes and second edges in the operation unit graph with the first nodes and the first edges in the architectural hints, and detecting pattern matches.

The method includes fusing operation units of the second nodes and the second edges in the operation unit graph into a consolidated operation units block, thereby producing a fused operation unit graph.

The method includes allocating the physical compute units and/or physical memory units of the reconfigurable data processor to the fused operation unit graph.

The method includes executing the fused operation unit graph on the reconfigurable data processor based on the allocation.

Each of the features discussed in the particular implementation section for other implementations apply equally to this implementation. As indicated above, all the other features are not repeated here and should be considered repeated by reference. The reader will understand how features identified in these implementations can readily be combined with sets of base features identified in other implementations.

The architectural hints specify a first output operation unit in the pattern as a first output node.

The method includes detecting the pattern matches by matching the first output node specified by the architectural hints with a second output node in the operation unit graph, and beginning with the second output node in the operation unit graph, traversing the operation unit graph to determine that the second nodes and the second edges in the operation unit graph match the first nodes and the first edges in the architectural hints. In one implementation, the traversal is an upward traversal.

The method includes identifying an operation unit of the operation unit graph that is fused into the consolidated operation units block but has a dataflow to another operation unit of the operation unit graph which is outside the consolidated operation units block, duplicating the identified operation unit and its dataflows and duplicating any other operation unit in the consolidated operation units block that provides input to the identified operation unit and its dataflows, and, based on the operation unit graph with the consolidated operation units block and the duplicated operation units and dataflows, performing the allocating and the executing.

In one implementation, the architectural hints are expressed as lists of nodes and edges that translate into a pattern graph.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

We disclose a computer-implemented method of allocating available physical compute units and/or physical memory units (available PCUs) of a reconfigurable data processor to operation units of an operation unit graph for execution thereof.

The method includes initializing lower ("stage_latency_low") and upper ("stage_latency_high") search bounds of generic stage compute processing time ("stage_latency") required for executing an operation unit of the operation unit graph.

The method includes selecting, for evaluation, an intermediate stage compute processing time (e.g., "stage_latency_average") between the lower ("stage_latency_low") and upper ("stage_latency_high") search bounds of the generic stage compute processing time ("stage_latency").

The method includes determining a pipeline number ("total_PCUs") of the physical compute units and/or the physical memory units required to process a pipeline compute load of the operation unit graph on the reconfigurable data processor.

The method includes, for each of the operation units ("for node in fused_graph") of the operation unit graph, determining a specific stage compute processing time ("node_latency_with_one-PCU") required to process a stage compute load ("node.get_flop( )") of a respective one of the operation units using only one physical compute unit and/or only one physical memory unit, and determining a stage number ("node_PCUs") of the physical compute units and/or the physical memory units required to process the stage compute load ("node.get_flop( )") of the respective one of the operation units by dividing the specific stage compute processing time ("node_latency_with_one_PCU") with the intermediate stage compute processing time (e.g., "stage_latency_average").

The method includes summing the stage number ("node_PCUs") of the physical compute units and/or the physical memory units for each of the operation units and producing the pipeline number of the physical compute units and/or the physical memory units ("total_PCUs").

The method includes, iteratively, initializing new lower ("stage_latency_low") and upper ("stage_latency_high") search bounds of the generic stage compute processing time ("stage_latency") and selecting, for evaluation in a next iteration, a new intermediate stage compute processing time between the new lower and upper search bounds of the generic stage compute processing time taking into account whether the pipeline number ("total_PCUs") of the physical compute units and/or the physical memory units produced for a prior intermediate stage compute processing time in a previous iteration is lower or higher than the available (available_PCUs) physical compute units and/or physical memory unit.

The method includes terminating the iterative initializing and selecting when the pipeline number of the physical compute units and/or the physical memory units produced for a current intermediate stage compute processing time in a current iteration meets a convergence criteria.

The method includes allocating the available physical compute units and/or physical memory units to the operation units of the operation unit graph based on the current intermediate stage compute processing time.

The method includes executing the operation units of the operation unit graph on the reconfigurable data processor based on the allocation.

Each of the features discussed in the particular implementation section for other implementations apply equally to this implementation. As indicated above, all the other features are not repeated here and should be considered repeated by reference. The reader will understand how features identified in these implementations can readily be combined with sets of base features identified in other implementations.

In one implementation, the convergence criteria can occur when the difference between the upper search bound and the lower search bound is below a threshold.

In one implementation, the lower search bound of the generic stage compute processing time can be based on maximum utilization of the reconfigurable data processor and determined by dividing the pipeline compute load of the operation unit graph with total processing capacity of the reconfigurable data processor.

In one implementation, the pipeline compute load of the operation unit graph can be determined by a total number of floating point operations (FLOP) required to execute the operation unit graph.

In one implementation, the total processing capacity of the reconfigurable data processor can be determined by a maximum number of FLOP executable by the reconfigurable data processor per second (FLOP/s).

In one implementation, the upper search bound of the generic stage compute processing time can be based on multiplying the lower search bound of the generic stage compute processing time with a minimum utilization factor. In some implementations, the minimum utilization factor is one hundred.

In one implementation, the method includes continuing the iterative initializing and selecting as long as the difference between the upper search bound and the lower search bound is above a threshold.

In one implementation, the intermediate stage compute processing time can be an average ("stage_latency_average") of the lower ("stage_latency_low") and upper ("stage_latency_high") search bounds of the generic stage compute processing time ("stage_latency").

In one implementation, when the pipeline number of the physical compute units and/or the physical memory units produced for the prior intermediate stage compute processing time in the previous iteration is lower than the available physical compute units and/or physical memory units, the method includes setting the new upper search bound for the next iteration as the prior intermediate stage compute processing time.

In one implementation, when the pipeline number of the physical compute units and/or the physical memory units produced for the prior intermediate stage compute processing time in the previous iteration is higher than the available physical compute units and/or physical memory units, the method includes setting the new lower search bound for the next iteration as the prior intermediate stage compute processing time.

In one implementation, the stage compute load of the respective one of the operation units, which means a total number of floating point operations (FLOP) required to execute the respective one of the operation units, is determined by its operation type, input dimensionality, and output dimensionality.

In one implementation, the method includes determining the stage number of the physical compute units and/or the physical memory units required to process the stage compute load by rounding up to an integer a result of dividing the stage compute processing time with the intermediate stage compute processing time.

In one implementation, the method includes determining a throughput value based on the current intermediate stage compute processing time.

In one implementation, the method includes determining a pipeline compute processing time required for executing the operation unit graph based on multiplying a number of the operation units of the operation unit graph with the current intermediate stage compute processing time.

In one implementation, the method includes selecting those operation units of the operation unit graph whose stage compute processing time is relatively greater than most other operation units of the operation unit graph and allocating additional available physical compute units and/or the physical memory units to the selected operation units.

In one implementation, the allocation results in each of the operation units of the operation unit graph having substantially matching stage compute processing time.

In one implementation, the operation unit graph can be a fused operation unit graph with at least one fused operation unit.

In one implementation, the operation unit graph can be a deep neural network.

In one implementation, the method includes generating, for display, data that visualizes the current intermediate stage compute processing time in the current iteration that meets the convergence criteria, the pipeline number of the physical compute units and/or the physical memory units produced for the current intermediate stage compute processing time, the stage compute processing time required to process the stage compute load of the respective one of the operation units using the only one physical compute unit and/or the only one physical memory unit, and/or the stage number of the physical compute units and/or the physical memory units required to process the stage compute load of the respective one of the operation units.

In one implementation, the method includes generating, for display, data that visualizes the throughput value determined based on the current intermediate stage compute processing time.

In one implementation, the method includes generating, for display, data that visualizes the pipeline compute processing time required for executing the operation unit graph.

In one implementation, the method includes generating, for display, data that visualizes available physical compute units and/or physical memory units respectively allocated to each of the operation units of the operation unit graph.

In one implementation, the iterative initializing and selecting is based on a binary search.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

We disclose a computer-implemented method of allocating available physical compute units and/or physical memory units (available PCUs) of a reconfigurable data processor to operation units of an operation unit graph for execution thereof.

The method includes initializing lower ("stage_latency_low") and upper ("stage_latency_high") search bounds of generic stage compute processing time required for executing an operation unit of the operation unit graph.

The method includes selecting, for evaluation, an intermediate stage compute processing time (e.g., "stage_latency_average") between the lower ("stage_latency_low") and upper ("stage_latency_high") search bounds of the generic stage compute processing time.

The method includes determining a pipeline number ("total_PCUs", "get_graph_PCUs") of the physical compute units and/or the physical memory units required to process a pipeline compute load of the operation unit graph on the reconfigurable data processor.

The method includes, iteratively, initializing new lower and upper search bounds of the generic stage compute processing time and selecting, for evaluation in a next iteration, a new intermediate stage compute processing time between the new lower and upper search bounds of the generic stage compute processing time taking into account whether the pipeline number of the physical compute units and/or the physical memory units produced for a prior intermediate stage compute processing time in a previous iteration is lower or higher than the available physical compute units and/or physical memory unit (available_PCUs).

The method includes terminating the iterative initializing and selecting when the pipeline number of the physical compute units and/or the physical memory units produced for a current intermediate stage compute processing time in a current iteration meets a convergence criteria.

Each of the features discussed in the particular implementation section for other implementations apply equally to this implementation. As indicated above, all the other features are not repeated here and should be considered repeated by reference. The reader will understand how features identified in these implementations can readily be combined with sets of base features identified in other implementations.

The method includes, for each of the operation units ("for node in fused_graph") of the operation unit graph, determining a specific stage compute processing time ("node_latency_with_one_PCU") required to process a stage compute load ("node.get_flop( )") of a respective one of the operation units using only one physical compute unit and/or only one physical memory unit, and determining a stage number ("node_PCUs") of the physical compute units and/or the physical memory units required to process the stage compute load ("node.get_flop( )") of the respective one of the operation units by dividing the specific stage compute processing time ("node_latency_with_one_PCU") with the intermediate stage compute processing time ("stage_latency", e.g., "stage_latency_average").

The method includes summing the stage number ("node_PCUs") of the physical compute units and/or the physical memory units for each of the operation units and producing the pipeline number of the physical compute units and/or the physical memory units.

The method includes allocating the available physical compute units and/or physical memory units to the operation units of the operation unit graph based on the current intermediate stage compute processing time.

The method includes executing the operation units of the operation unit graph on the reconfigurable data processor based on the allocation.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented method of efficiently executing an operation unit graph on a reconfigurable data processor with a target architecture that includes physical compute units and/or physical memory units, the method including:
reducing a number of the physical compute units and/or physical memory units of the reconfigurable data processor required to execute the operation unit graph by
receiving, from a user, architectural hints that are specific to the target architecture of the reconfigurable data processor,
wherein the architectural hints
call for fusing first operation units when executing a pattern of the first operation units on the physical compute units and/or physical memory units of the reconfigurable data processor,
specify the first operation units in the pattern as first nodes,
specify first dataflows among the first operation units in the pattern as first edges, and
direct fusion among the first operation units in the pattern;
scanning the operation unit graph to detect an instance of the pattern of the first operation units specified by the architectural hints, including
matching second nodes and second edges in the operation unit graph with the first nodes and the first edges in the architectural hints, and detecting a pattern match;
fusing operation units of the second nodes and the second edges in the operation unit graph into a consolidated operation units block, thereby producing a fused operation unit graph;
allocating a set of physical compute units and/or physical memory units of the physical compute units and/or physical memory units of the reconfigurable data processor to the fused operation unit graph; and
executing the fused operation unit graph on the reconfigurable data processor based on the allocation.

2. The computer-implemented method of claim 1, wherein the architectural hints specify a first output operation unit in the pattern as a first output node.

3. The computer-implemented method of claim 2, further including:

detecting the pattern matches by
matching the first output node specified by the architectural hints with a second output node in the operation unit graph, and
beginning with the second output node in the operation unit graph,
traversing the operation unit graph to determine that the second nodes and the second edges in the operation unit graph match the first nodes and the first edges in the architectural hints.

4. The computer-implemented method of claim 3, wherein the traversal is an upward traversal.

5. The computer-implemented method of claim 1, further including:
identifying an operation unit of the operation unit graph that is fused into the consolidated operation units block but has a dataflow to another operation unit of the operation unit graph which is outside the consolidated operation units block;
duplicating the identified operation unit and its dataflows and duplicating any other operation unit in the consolidated operation units block that provides input to the identified operation unit and its dataflows to create duplicated operation units and dataflows in the fused operation unit graph; and
based on the fused operation unit graph with the consolidated operation units block and the duplicated operation units and dataflows, performing the allocating and the executing.

6. The computer-implemented method of claim 1, wherein the architectural hints are expressed as lists of nodes and edges that translate into a pattern graph.

7. A non-transitory computer readable storage medium impressed with computer program instructions to efficiently execute an operation unit graph on a reconfigurable data processor with a target architecture that includes physical compute units and/or physical memory units, the instructions, when executed on a processor, implement a method comprising:
reducing a number of the physical compute units and/or physical memory units of the reconfigurable data processor required to execute the operation unit graph by
receiving, from a user, architectural hints that are specific to the target architecture of the reconfigurable data processor,
wherein the architectural hints
call for fusing first operation units when executing a pattern of the first operation units on the physical compute units and/or physical memory units of the reconfigurable data processor,
specify the first operation units in the pattern as first nodes,
specify first dataflows among the first operation units in the pattern as first edges, and
direct fusion among the first operation units in the pattern;
scanning the operation unit graph to detect an instance of the pattern of the first operation units specified by the architectural hints, including
matching second nodes and second edges in the operation unit graph with the first nodes and the first edges in the architectural hints, and detecting pattern matches;
fusing operation units of the second nodes and the second edges in the operation unit graph into a consolidated operation units block, thereby producing a fused operation unit graph;
allocating a set of physical compute units and/or physical memory units of the physical compute units and/or physical memory units of the reconfigurable data processor to the fused operation unit graph; and
executing the fused operation unit graph on the reconfigurable data processor based on the allocation.

8. The non-transitory computer readable storage medium of claim 7, wherein the architectural hints specify a first output operation unit in the pattern as a first output node.

9. The non-transitory computer readable storage medium of claim 8, implementing the method further comprising:
detecting the pattern matches by
matching the first output node specified by the architectural hints with a second output node in the operation unit graph, and
beginning with the second output node in the operation unit graph,
traversing the operation unit graph to determine that the second nodes and the second edges in the operation unit graph match the first nodes and the first edges in the architectural hints.

10. The non-transitory computer readable storage medium of claim 9, wherein the traversal is an upward traversal.

11. The non-transitory computer readable storage medium of claim 7, implementing the method further comprising:
identifying an operation unit of the operation unit graph that is fused into the consolidated operation units block but has a dataflow to another operation unit of the operation unit graph which is outside the consolidated operation units block;
duplicating the identified operation unit and its dataflows and duplicating any other operation unit in the consolidated operation units block that provides input to the identified operation unit and its dataflows to create duplicated operation units and dataflows in the fused operation unit graph; and
based on the fused operation unit graph with the consolidated operation units block and the duplicated operation units and dataflows, performing the allocating and the executing.

12. The non-transitory computer readable storage medium of claim 7, wherein the architectural hints are expressed as lists of nodes and edges that translate into a pattern graph.

13. A system including one or more processors coupled to memory, the memory loaded with computer instructions to efficiently execute an operation unit graph on a reconfigurable data processor with a target architecture that includes physical compute units and/or physical memory units, the instructions, when executed on the processors, implement actions comprising:
reducing a number of the physical compute units and/or physical memory units of the reconfigurable data processor required to execute the operation unit graph by
receiving, from a user, architectural hints that are specific to the target architecture of the reconfigurable data processor,
wherein the architectural hints
call for fusing first operation units when executing a pattern of the first operation units on the physical compute units and/or physical memory units of the reconfigurable data processor,
specify the first operation units in the pattern as first nodes,
specify first dataflows among the first operation units in the pattern as first edges, and
direct fusion among the first operation units in the pattern;

scanning the operation unit graph to detect an instance of the pattern of the first operation units specified by the architectural hints, including
matching second nodes and second edges in the operation unit graph with the first nodes and the first edges in the architectural hints, and detecting a pattern match;
fusing operation units of the second nodes and the second edges in the operation unit graph into a consolidated operation units block, thereby producing a fused operation unit graph;
allocating a set of physical compute units and/or physical memory units of the physical compute units and/or physical memory units of the reconfigurable data processor to the fused operation unit graph; and
executing the fused operation unit graph on the reconfigurable data processor based on the allocation.

14. The system of claim 13, wherein the architectural hints specify a first output operation unit in the pattern as a first output node.

15. The system of claim 14, implementing actions further comprising:
detecting the pattern matches by
matching the first output node specified by the architectural hints with a second output node in the operation unit graph, and
beginning with the second output node in the operation unit graph,
traversing the operation unit graph to determine that the second nodes and the second edges in the operation unit graph match the first nodes and the first edges in the architectural hints.

16. The system of claim 15, wherein the traversal is an upward traversal.

17. The system of claim 13, implementing actions further comprising:
identifying an operation unit of the operation unit graph that is fused into the consolidated operation units block but has a dataflow to another operation unit of the operation unit graph which is outside the consolidated operation units block;
duplicating the identified operation unit and its dataflows and duplicating any other operation unit in the consolidated operation units block that provides input to the identified operation unit and its dataflows to create duplicated operation units and dataflows in the fused operation unit graph; and
based on the fused operation unit graph with the consolidated operation units block and the duplicated operation units and dataflows, performing the allocating and the executing.

18. The system of claim 13, wherein the architectural hints are expressed as lists of nodes and edges that translate into a pattern graph.

* * * * *